United States Patent
Aoyama et al.

(10) Patent No.: US 8,358,497 B2
(45) Date of Patent: *Jan. 22, 2013

(54) ELECTRODE FOIL FOR CAPACITOR, ELECTROLYTIC CAPACITOR USING THE SAME, AND METHOD FOR MANUFACTURING ELECTRODE FOIL FOR CAPACITOR

(75) Inventors: Tatsuji Aoyama, Kyoto (JP); Akiyoshi Oshima, Osaka (JP)

(73) Assignee: Panasonic Corporation, Osaka (JP)

( * ) Notice: Subject to any disclaimer, the term of this patent is extended or adjusted under 35 U.S.C. 154(b) by 223 days.

This patent is subject to a terminal disclaimer.

(21) Appl. No.: 12/921,029

(22) PCT Filed: Sep. 11, 2008

(86) PCT No.: PCT/JP2008/002510
§ 371 (c)(1),
(2), (4) Date: Sep. 3, 2010

(87) PCT Pub. No.: WO2010/029598
PCT Pub. Date: Mar. 18, 2010

(65) Prior Publication Data
US 2011/0002088 A1    Jan. 6, 2011

(51) Int. Cl.
*H01G 9/15* (2006.01)
(52) U.S. Cl. ........ 361/524; 361/523; 361/525; 361/528; 361/529; 361/530
(58) Field of Classification Search .......... 361/524, 361/523, 525, 528–529, 516–519, 530, 540–541; 29/25.01–25.03, 25.45
See application file for complete search history.

(56) References Cited

U.S. PATENT DOCUMENTS

| | | | |
|---|---|---|---|
| 5,431,971 A | 7/1995 | Allegret et al. | |
| 6,287,673 B1 | 9/2001 | Katsir et al. | |
| 6,962,612 B1* | 11/2005 | Saito et al. | 29/25.03 |
| 7,245,479 B2* | 7/2007 | Kobayashi et al. | 361/523 |
| 7,289,313 B2* | 10/2007 | Takeda et al. | 361/523 |
| 7,778,012 B2* | 8/2010 | Fujimoto | 361/523 |
| 8,097,184 B2* | 1/2012 | Yoshida et al. | 252/500 |
| 2002/0080559 A1 | 6/2002 | Nonaka et al. | |
| 2010/0202102 A1* | 8/2010 | Aoyama et al. | 361/525 |

FOREIGN PATENT DOCUMENTS

| | | |
|---|---|---|
| JP | 59-167009 A | 9/1984 |
| JP | 64-012516 A | 1/1989 |
| JP | 02-267916 A | 11/1990 |
| JP | 05-129163 A | 5/1993 |
| JP | 05-190400 | 7/1993 |

(Continued)

OTHER PUBLICATIONS

International Search Report for PCT/JP2008/002510.

*Primary Examiner* — Nguyen T Ha
(74) *Attorney, Agent, or Firm* — Pearne & Gordon LLP

(57) ABSTRACT

An electrode foil includes a base made of foil of valve metal, and a rough surface layer made of valve metal provided on a surface of the base. The rough surface layer includes plural tree structures extending d from the base. Each of the tree structures includes plural particles of valve metal linked together, and is branched into plural twigs. This electrode foil provides an electrolytic capacitor with a small size and a large capacitance.

26 Claims, 17 Drawing Sheets

FOREIGN PATENT DOCUMENTS

| | | |
|---|---|---|
| JP | 06-005476 A | 1/1994 |
| JP | 06-044977 | 2/1994 |
| JP | 09-171945 | 6/1997 |
| JP | 10-340829 | 12/1998 |
| JP | 11-317331 A | 11/1999 |
| JP | 2001-52966 A | 2/2001 |
| JP | 2002-299182 A | 10/2002 |
| JP | 2003-045753 | 2/2003 |
| JP | 2003-297694 A | 10/2003 |
| JP | 2005-223122 | 8/2005 |
| JP | 2006-108159 A | 4/2006 |
| JP | 2008-010490 | 1/2008 |

\* cited by examiner

PRIOR ART

ELECTRODE FOIL FOR CAPACITOR, ELECTROLYTIC CAPACITOR USING THE SAME, AND METHOD FOR MANUFACTURING ELECTRODE FOIL FOR CAPACITOR

This application is a U.S. National Stage Application of the PCT International application No. PCT/JP2008/002510.

TECHNICAL FIELD

The present invention relates to an electrode foil for capacitor and an electrolytic capacitor including the electrode foil, and to a method for manufacturing the electrode foil.

BACKGROUND ART

FIG. 29 is a partly sectional perspective view of conventional electrolytic capacitor 5001 disclosed in Patent Literature 1. Capacitor element 11 includes electrode foil 12 as an anode, electrode foil 13 as a cathode, and separator 14 provided between electrode foils 12 and 13. Electrode foils 12 and 13 and separator 14 are rolled together Electrode foil 12 includes an aluminum foil having a surface having an effective area enlarged by etching, and a dielectric oxide film formed on the surface of the aluminum foil by anodizing. Electrode foil 13 includes an aluminum foil having a surface having an effective area enlarged by etching. Capacitor element 11 is impregnated with electrolyte 17. Capacitor element 11 and electrolyte 17 are accommodated in case 18 made of aluminum. Case 18 is sealed with sealing plug 19. Lead wires 15 and 16 are connected to foils 12 and 13, respectively, and exposed to the outside of case 18.

In conventional electrolytic capacitor 5001, in order to obtain a large capacitance, the surface of the electrode foil is roughened by etching so as to increase the effective surface area. However, the surface area cannot increase beyond the technical and physical limitations in etching technique and mechanical strength of the electrode foils, hence preventing the capacitance from increasing.

The surface of aluminum electrode foil 12 is roughened by etching or vapor deposition.

Patent Literature 2 discloses an etching method. In this method, an aluminum foil undergoes electrolytic etching in an etching solution containing chlorine ions. First, the aluminum foil undergoes direct-current (DC) electrolytic etching process and then a dipping process. After that, the aluminum foil undergoes alternating-current (AC) electrolytic etching process with gradually increasing current density, and then, with a constant current density. This method allows the aluminum foil to have predetermined initial pits before the start of the AC electrolytic etching regardless of characteristics change of the foil. This provides electrode foil with high quality stably. However, the surface area cannot increase beyond the technical and physical limitations in processing accuracy in etching and mechanical strength of the electrode foil. That is, further increase in capacitance cannot be expected.

Patent literature 3 discloses a vapor deposition method. In this method, a base undergoes vapor deposition in a processing chamber. The chamber has an ambient gas containing oxygen or oxide in which aluminum is evaporated, then condensed and solidified. The pressure on the deposition zone in the chamber is within a range from 2.8 Pa to 0.3 Pa. In the ambient gas in the chamber, a vapor-deposited film is formed at a rate of thickness increase ranging from 0.03 μm/sec. to 0.2 μm/sec. on one or both surfaces of the base, thereby providing the aluminum foil having a rough surface. However, the vapor-deposited film is made of particles with weak bonding, by which a neck section connecting the particles can be broken during the anodizing on the aluminum foil. If the neck section is broken, a current flow is blocked at the broken position and therefore a predetermined capacitance cannot be obtained. Further, a mechanical stress exerted on the electrode foil in the rolling process can damage the vapor-deposited layer of the foil, thus preventing the capacitor element from being produced by a rolling process.

Recently, as increase in electronic devices operating at high frequencies, there is a growing demand for manufacturing a capacitor having a small impedance even in a high-frequency range. To meet the needs, a solid electrolytic capacitor in which conducting polymer with high electrical conductivity is used for solid electrolyte has been developed. Manufacturers seek to produce improved solid electrolytic capacitors having small equivalent series resistance (ESR) and small equivalent series inductance (ESL).

FIG. 30 is a perspective view of conventional solid electrolytic capacitor 5002 disclosed in Patent Literature 4. FIG. 31 is a plan view of capacitor element 411 of solid electrolytic capacitor 5002. Capacitor element 411 has a flat-plate shape. The surface of electrode foil made of aluminum as valve metal is roughened to obtain anode foil. A dielectric oxide film is formed on the surface of the anode foil. After that, insulating resist 412 is disposed on the surface of the anode foil to separate the anode foil into anode section 413 and a cathode forming section. Solid electrolyte of conductive polymers is formed on the dielectric oxide film in the cathode forming section. A carbon layer is formed on the solid electrolyte. A silver paste layer is formed on the carbon layer. The carbon layer and the silver paste layer constitute a cathode layer, providing cathode section 414. Anode section 413, cathode section 414, and resist 412 disposed between a node section 413, cathode section 414 are arranged in a longitudinal direction of the anode foil.

Anode common terminal 415 is connected to anode section 413 of capacitor element 411. In solid electrolytic capacitor 5002, plural capacitor elements 411 are stacked on anode common terminal 415. Anode section 413 of each capacitor element 411 is connected to anode common terminal 415 by, e.g. laser welding.

Cathode common terminal 416 is connected to cathode section 414 of capacitor element 411. Cathode common terminal 416 has bent section 416A at which both sides of terminal 416 are bent upward. Conductive adhesive 417 electrically connects between cathode common terminal 416 and cathode section 414 of each capacitor element 411, and connects between cathode sections 414 of capacitor elements 411.

Insulating package resin 418 covers multi-layered capacitor elements 411 such that anode common terminal 415 and cathode common terminal 416 are partly exposed to the outside. The exposed portions of anode common terminal 415 and cathode common terminal 416 are bent along the side to bottom of package resin 418 so as to provide anode terminal 415B and cathode terminal 416B on the bottom, thus providing surface-mount solid electrolytic capacitor 5002.

In solid electrolytic capacitor 5002, as described above, conductive adhesive 417 connects between bend 416A of cathode common terminal 416 and between cathode section 414 of capacitor element 411. This structure decreases an internal resistance of an entire structure of multi-layered capacitor elements 411, decreasing the ESR.

In solid electrolytic capacitor 5002, however, like in electrolytic capacitor 5001, electrode foil undergoes etching to have roughness on its surface and increases an effective surface area. The surface area cannot increase beyond the technical and physical limitations in etching technique and mechanical strength of the electrode foil. That is, further increase in capacitance cannot be expected.

In response to the demand for increase in capacitance, a rolled solid electrolytic capacitor has been introduced on the market. Compared to the multi-layered structure, the rolled structure is easy to increase capacitance. Patent Literature 5 discloses a conventional rolled solid electrolytic capacitor. This capacitor includes anode foil and cathode foil rolled on one another via a separator.

The separator, as is used in the conventional electrolytic capacitor employing electrolyte solution for electrolyte, is formed of the following plug: "electrolytic" paper formed of Manila fiber or kraft paper; glass fiber non-woven cloth; and insulating sheets, such as non-woven cloth composed mostly of a resin formed by a dry melt-blowing method. Instead of the plugs above, the separator may be synthetic resin, such as non-woven cloth made of polyvinyl-alcohol-based resin or non-woven cloth mixed the polyvinyl-alcohol-based resin with other resin.

In solid electrolytic capacitor 5002, however, like in electrolytic capacitor 5001, electrode foil undergoes etching to have roughness on its surface and increases an effective surface area. The surface area cannot increase beyond the technical and physical limitations in etching technique and mechanical strength of the electrode foil. That is, further increase in capacitance cannot be expected.

Patent Literature 1: JP2005-223122A
Patent Literature 2: JP09-171945A
Patent Literature 3: JP07-15864B
Patent Literature 4: JP2003-45733A
Patent Literature 5: JP10-340829A

SUMMARY OF THE INVENTION

An electrode foil includes a base made of foil of valve metal, and a rough surface layer made of valve metal provided on a surface of the base. The rough surface layer includes plural tree structures extending d from the base. Each of the tree structures includes plural particles of valve metal linked together, and is branched into plural twigs.

This electrode foil provides an electrolytic capacitor with a small size and a large capacitance.

REFERENCE NUMERALS

2 Electrode Foil (First Electrode Foil)
2A Dielectric Oxide Film
3 Electrode Foil (Electrode, Second Electrode Foil)
4 Separator
7 Driving Electrolyte
91 Base
91A Rough Surface Layer
409 Base
409A Rough Surface Layer
451 Electrode Foil (First Electrode Foil)
453 Dielectric Oxide Film
454 Solid Electrolyte
455 Carbon Layer
456 Silver Paste Layer
457 Cathode Layer (Electrode)
502 Electrode Foil (Electrode, Second Electrode Foil)
503 Separator
509 Dielectric Oxide Film 511 Base
511A Rough surface Layer
603 Fine Particles
605 Tree Structure
703 Fine Particles
705 Tree Structure
803 Fine Particles
805 Tree Structure

DETAIL DESCRIPTION OF PREFERRED EMBODIMENTS

Exemplary Embodiment 1

Figure 1:
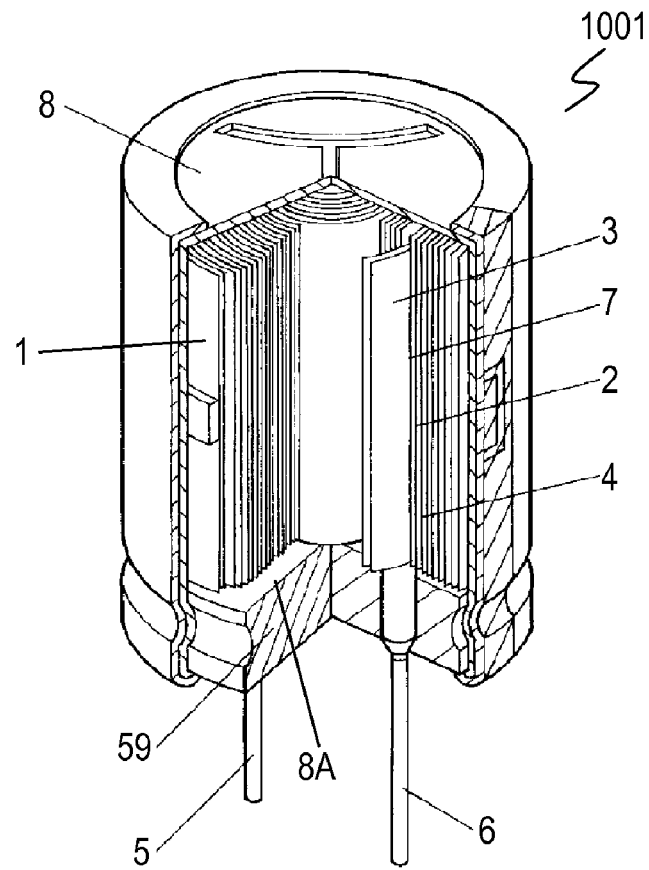
FIG. 1 is a partly sectional perspective view of an electrolytic capacitor in accordance with Exemplary Embodiment 1 of the present invention.
Figure 2:
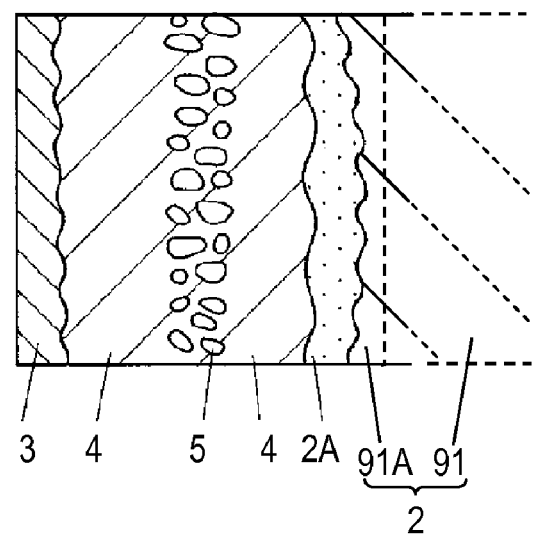
FIG. 2 is an enlarged sectional view of the electrolytic capacitor shown in FIG. 1.

FIG. 1 is a partly-sectional perspective view of electrolytic capacitor 1001 in accordance with Exemplary Embodiment 1 of the present invention. FIG. 2 is an enlarged sectional view of electrolytic capacitor 1001. Capacitor element 1 includes electrode foils 2 and 3 and separator 4 provided between electrode foils 2 and 3. Electrode foil 2 and electrode foil 3 function as electrodes, i.e., anode and cathode, respectively. Electrode foils 2 and 3 and separator 4 are rolled together to form a roll-type of capacitor element 1. Electrode foil 2 includes base 91 and rough surface layer 91A. Base 91 is made of foil of valve metal, such as aluminum. Rough surface layer 91A is formed by vapor-depositing valve metal, aluminum, on a surface of base 91. Rough surface layer 91A is rougher than base 91. Electrode foil 2 is anodized to form dielectric oxide film 2A on rough surface layer 91A. Electrode foil 3 is obtained by etching foil made of valve metal, such as aluminum. Lead wires 5 and 6 are connected to electrode foils 2 and 3, respectively. Separator 4 is disposed between dielectric oxide film 2A and electrode foil 3 to contact dielectric oxide film 2A and electrode foil 3. Separator 4 is impregnated with electrolyte 7 such that electrolyte 7 contacts dielectric oxide film 2A and electrode foil 3. Case 8 made of aluminum accommodates capacitor element 1 and driving electrolyte 7 therein. Sealing plug 59 made of rubber seals opening 8A of case 8. Lead wires 5 and 6 and are exposed to the outside of case 8 through sealing plug 59. Electrode foil 3 functions as an electrode of a cathode.

Figure 3:
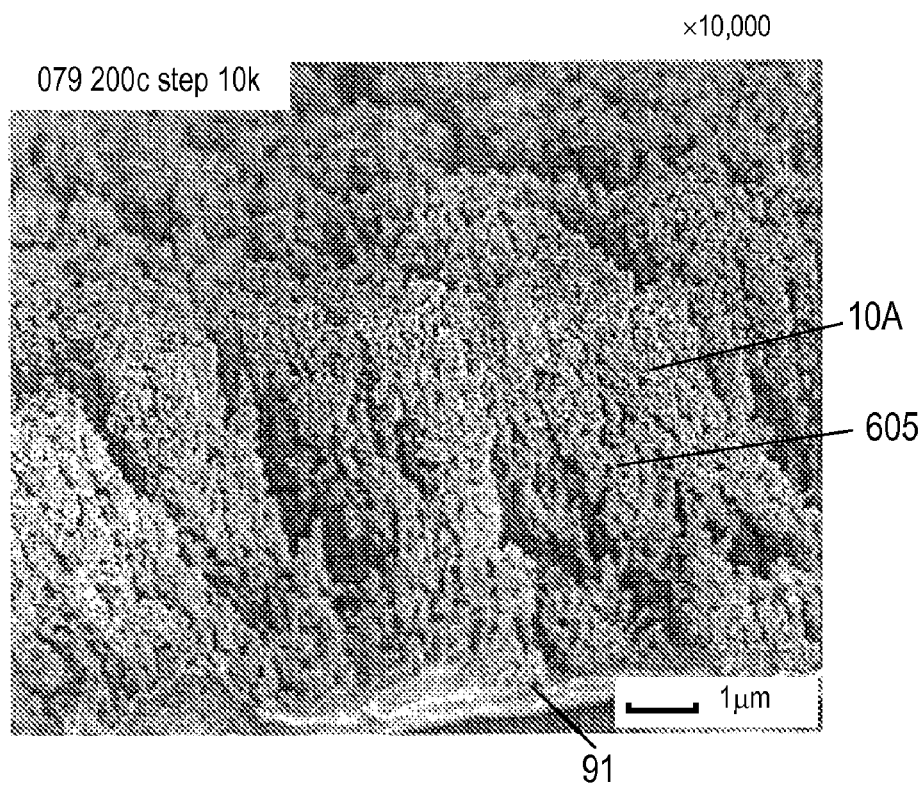
FIG. 3 is an enlarged view of an electrode foil of the electrolytic capacitor in accordance with Embodiment 1.
Figure 4:
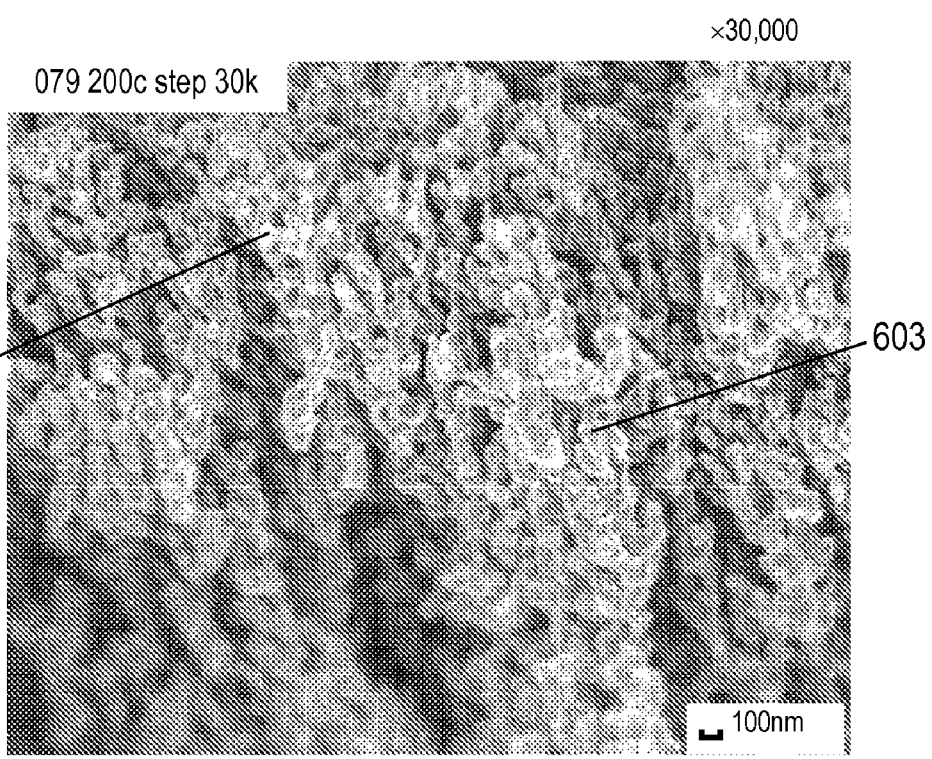
FIG. 4 is an enlarged view of the electrode foil shown in FIG. 3.

FIGS. 3 and 4 are enlarged views of electrode foil 2, microscopic photographs captured with scanning electron microscopes (SEM) and having magnifying powers of ten thousand and thirty thousand, respectively. As shown in FIGS. 3 and 4, rough surface layer 91A is formed of plural tree structures 605 clustered together and extending from base 91. Each tree structure 605 branches into plural twigs, and is formed of plural fine particles 603 coupled to each other and linking to have a shape of a caulerpa lentillifera.

Figure 5:
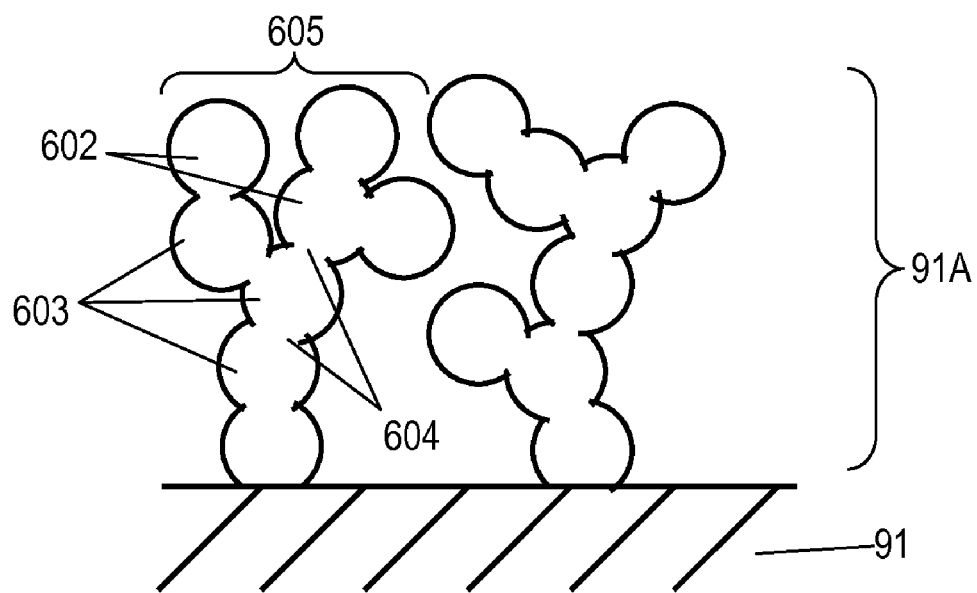
FIG. 5 is a schematic view of the electrode foil shown in FIG. 3.

FIG. 5 is a schematic view of electrode foil 2. Rough surface layer 91A is formed of plural tree structures 605 clustered together and extending from base 91A. Each tree structure 605 branches into plural twigs 602, and is formed of plural fine particles 603 coupled to each other and linking to have a shape of a caulerpa lentillifera.

Figure 6:
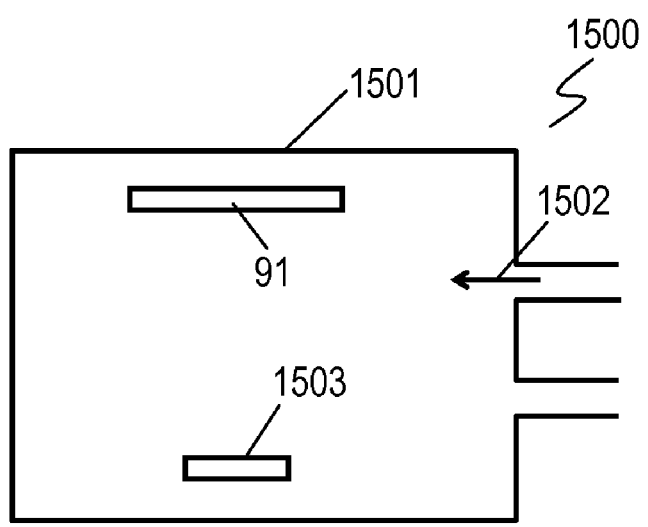
FIG. 6 is a schematic view of an apparatus for manufacturing the electrode foil shown in FIG. 3.

A method for forming rough surface layer 91A having tree-structures 605 on base 91 by vacuum vapor deposition will be described below. FIG. 6 is a schematic view of apparatus 1500 for forming rough surface layer 91A. First, base 91 made of aluminum as valve action metal is placed in evaporation chamber 1501. The inside of chamber 1501 is maintained at vacuum at a pressure ranging from 0.01 Pa to 0.001 Pa. After that, ambient gas 1502 is put into chamber 1501. Ambient gas is made of 1 part by volume of oxygen gas and 2 to 6 parts by volume of argon gas. While atmosphere around base 91 is kept under a pressure ranging from 10 Pa to 30 Pa with the ambient gas at a temperature ranging from 150° C. to 300° C., evaporation source 1503 made of aluminum as valve action metal is placed in evaporation chamber 1501. Fine particles 603 of aluminum are deposited on the surface of base 91 to form tree structures 605, thereby providing rough surface layer 91A.

Base 91 according to Embodiment 1 is high-purity aluminum foil with a thickness of 50 μm. Ambient gas 1502 containing argon gas and oxygen gas is supplied into vacuum to cause file particles 603 made of aluminum to deposit on the surface of base 91, thereby providing electrode foil 2 shown in FIGS. 3 to 5. According to Embodiment 1, evaporation chamber 1501 before having ambient gas 1502 supplied therein is maintained as a vacuum at a pressure of 0.004 Pa. Ambient gas 1502 contains 1 part by volume of oxygen gas and 4 parts by volume of argon gas. The pressure of ambient gas 1502 is 20 Pa. The temperature of evaporation chamber 1501, that is, base 91 at vapor deposition of particles 603 is 200° C.

Figure 7:
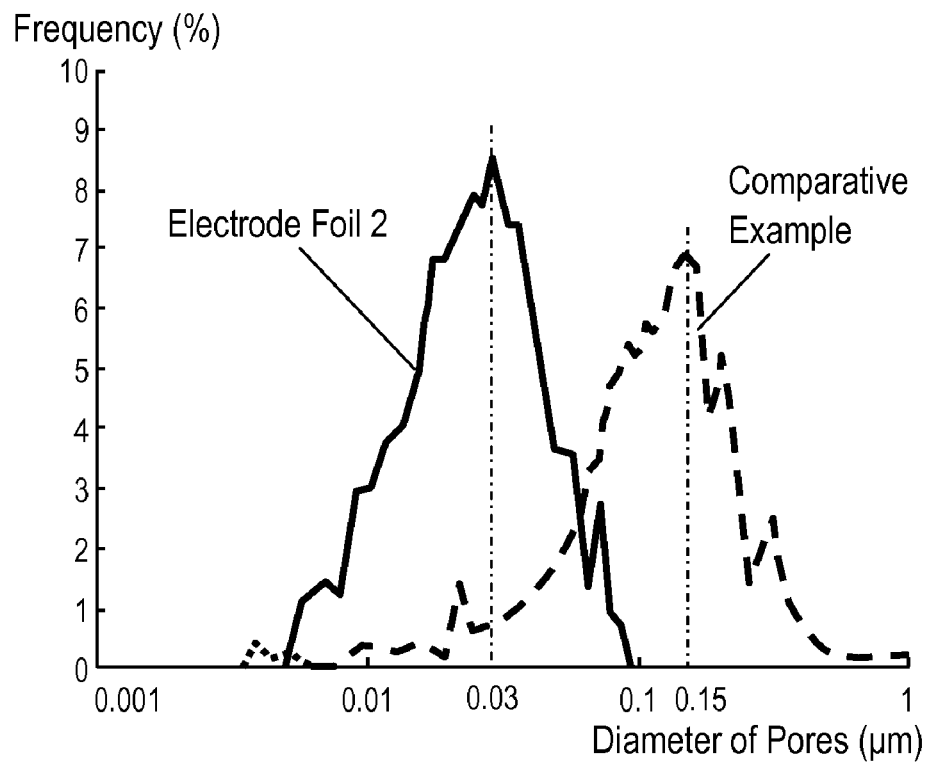
FIG. 7 shows distribution of diameters of pores in the electrode foil in accordance with Embodiment 1.

FIG. 7 shows a distribution of diameters of pores in electrode foil 2 and a distribution of diameters of pores in a comparative example of an electrode foil which is etched. The mode value of the diameters of the pores in electrode foil 2 is about 0.03 μm, which is extremely smaller than the mode of the comparative example of about 0.15 μm. The surface area of electrode foil 2 can be increased more than the comparative example. Rough surface layer 91A is formed of tree structures 605 extending from base 91, and can be impregnated with a more amount of polymer solution than the comparative example.

Tree structure 605 is branched into twigs 602 formed of fine particles 603 linked to have a shape of a caulerpa lentillifera. This structure increases the bonding strength between fine particles 603, thus prevents necks 604 partially thin between particles 603 from breaking. Thus, necks 604 do not break when electrode foil 2 is anodized to form dielectric oxide film 2A. This structure thus not only increases the mechanical strength but also reduces the decreasing of the capacitance, accordingly allowing roll-type capacitor element 1 to be easily manufactured.

Electrolyte 7 contains organic solvent, such as ethylene glycol or γ-butyl lactone, and solute, such as boric acid or ammonium borate, that is soluble in the solvent. The solute may be azelaic acid, butyloctane dioxide, 5,6-decane dicarboxylic acid, or 1,7-octane dicarboxylic acid. These solutes allows electrolyte 7 to contain less amount of water, and therefore, prevents an internal pressure of electrolytic capacitor 1001 from increasing due to water evaporation, hence preventing sealing plug from opening even at a temperature exceeding 100° C.

Sealing plug 59 is made of, e.g. styrene-butadiene rubber (SBR), ethylene-propylene copolymer rubber (EPM), ethylene-propylene-diene terpolymer rubber (EPDM), or isobutylene-isoprene copolymer rubber (IIR). The material of the rubber plugs is determined according to the composition of electrolyte 7. The edge of opening 8A of metal case 8 is curled during a process for sealing case 8, and therefore, sealing plug 59 is highly elastic.

In electrolytic capacitor 1001 according to Embodiment 1, electrode foil 3 to be a cathode is made of aluminum foil roughened by etching. Similarly to electrode foil 2, electrode foil 3 may be made of the aluminum foil including base 91 and rough surface layer 91A shown in FIGS. 3 to 5. In this case, the aluminum foil of the cathode is not anodized or is anodized even with a low voltage, such as about 2V.

Figure 29:
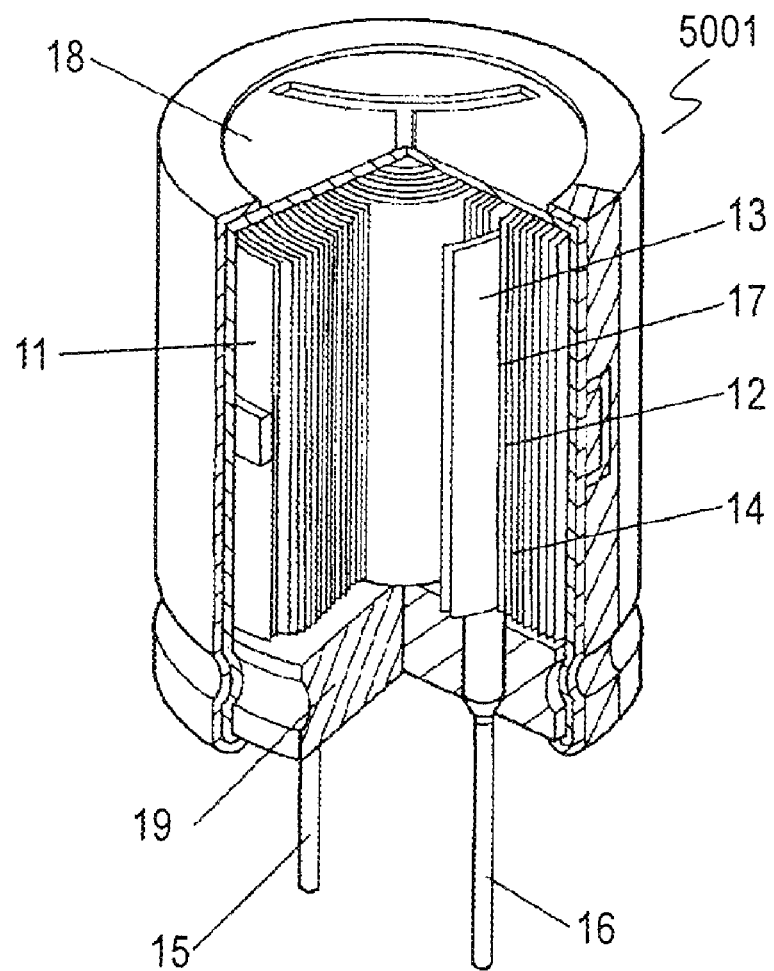
FIG. 29 is a partly sectional perspective view of a conventional electrolytic capacitor.
Figure 30:
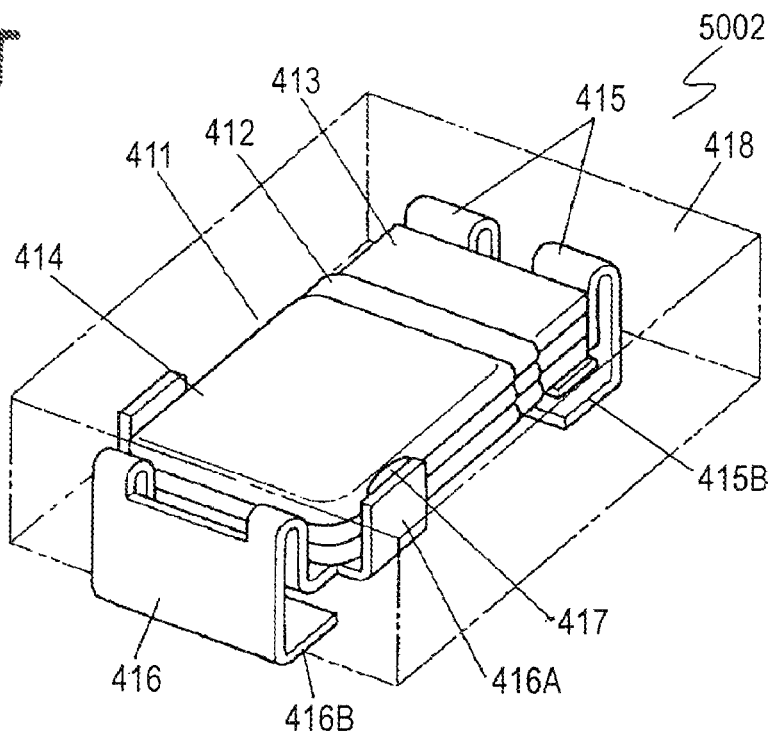
FIG. 30 is a perspective view of another conventional electrolytic capacitor.
Figure 31:
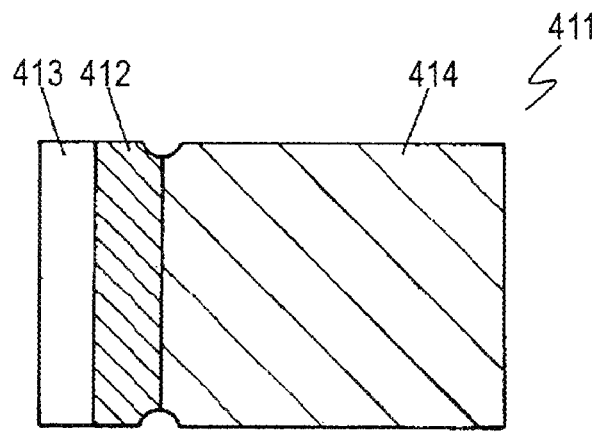
FIG. 31 is a plan view of a capacitor element of the electrolytic capacitor shown in FIG. 30.

In conventional electrolytic capacitor 5001 shown in FIG. 29, electrode foil 12 to be an anode and electrode foil 13 to be a cathode are both roughened by etching. In order to obtain a large capacitance, electrode foil 13 is larger than electrode foil 12. In contrast, in electrolytic capacitor 1001 according to Embodiment 1, the aluminum foil shown in of FIGS. 3 to 5 is used only for electrode foil 3 (i.e. the cathode), providing electrolytic capacitor 1001 with a capacitance larger than conventional electrolytic capacitor 5001.

Exemplary Embodiment 2

Figure 8:
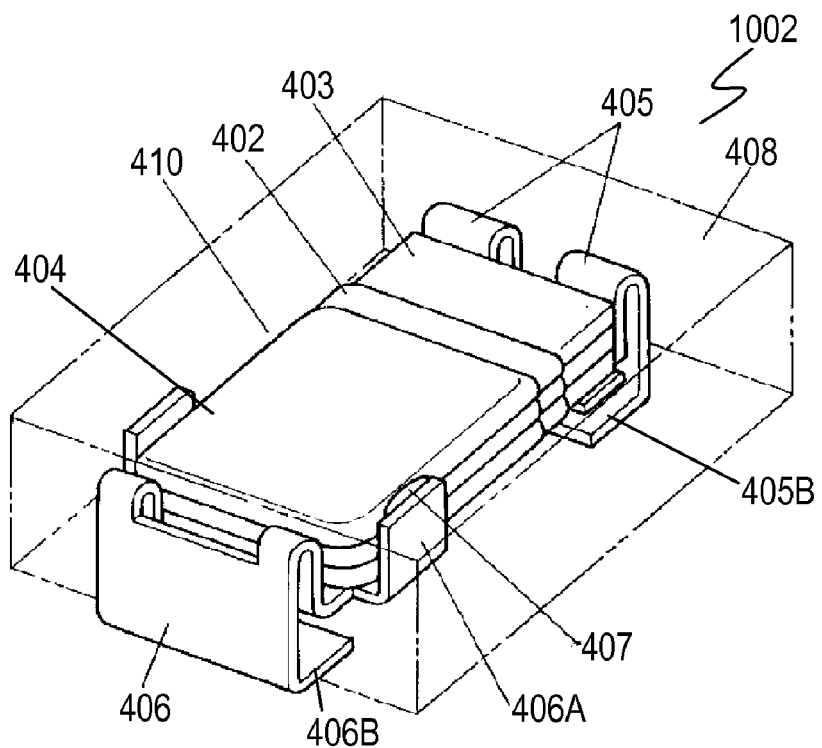
FIG. 8 is a perspective view of an electrolytic capacitor in accordance with Exemplary Embodiment 2 of the invention.
Figure 9:
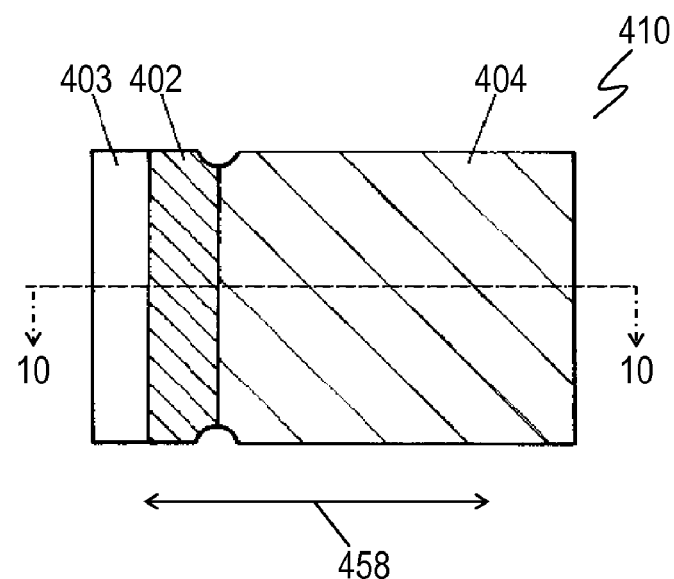
FIG. 9 is a plan view of a capacitor element of the electrolytic capacitor in accordance with Embodiment 2.
Figure 10:
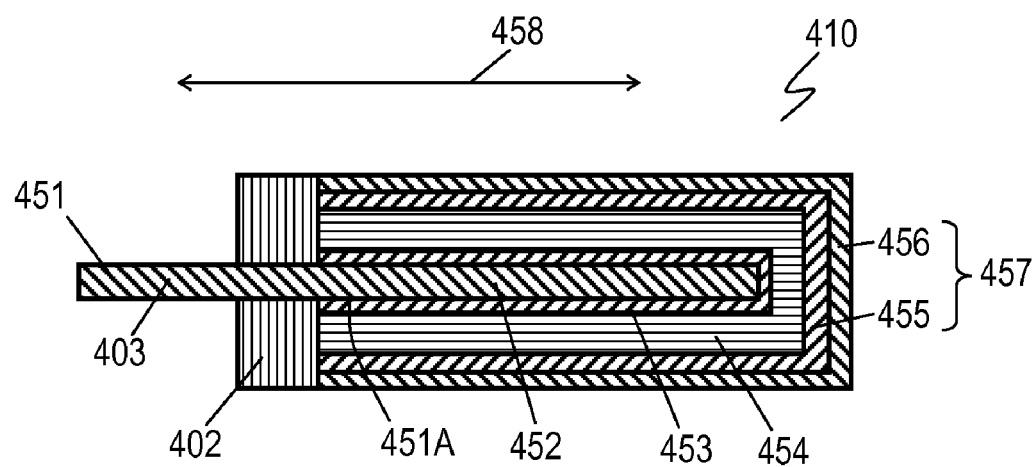
FIG. 10 is a sectional view of the capacitor element on line 10-10 shown in FIG. 9.

FIG. 8 is a perspective view of electrolytic capacitor 1002 in accordance with Exemplary Embodiment 2 of the present invention. FIG. 9 is a plan view of capacitor element 410 of electrolytic capacitor 1002. FIG. 10 is a sectional view of capacitor element 410 on line 10-10 shown in FIG. 9. Electrolytic capacitor 1002 is a solid electrolytic capacitor utilizing solid electrolyte as electrolyte. Electrolytic capacitor 1002 includes plural capacitor elements 410. Electrode foil 451 is made of valve metal, such as aluminum having surface 451A roughened. Dielectric oxide film 453 is formed on surface 451A. After that, insulating resist 402 is formed on surface 451A to separate surface 451A into anode section 403 and cathode forming section 452. Solid electrolyte 454 made of conductive polymer is formed on dielectric oxide film 453 in cathode forming section 452. Carbon layer 455 is formed on solid electrolyte 454. Silver paste layer 456 is formed on carbon layer 457. Carbon layer 455 and silver paste layer 456 constitute cathode layer 457, thus providing cathode section 404. Capacitor element 410 has a flat plate shape extending in longitudinal direction 458. In capacitor element 410, anode section 403 and cathode section 404 are arranged across resist 402 in longitudinal direction 458. Electrode foil 451 functions as the anode, and cathode layer 457 functions as the cathode.

Anode common terminal 405 is connected to anode sections 403 of capacitor elements 410. Capacitor elements 410 are stacked on anode common terminal 405. Anode sections 403 of capacitor elements 410 are connected to anode common terminal 405 by, for example, laser welding.

Cathode common terminal 406 is connected to cathode sections 404 of capacitor elements 410. Cathode common terminal 406 has a mounting section. Bent portion 406A is formed by bending both sides of the mounting section upwardly. Conductive adhesive 407 connects electrically between the mounting section of cathode common terminal 406 and each of cathode sections 404 of capacitor elements 411, and between bent portion 406A of cathode common terminal 406 and each of cathode sections 404.

Package resin 408 having an insulating property covers stacked capacitor elements 410, anode common terminal 405, and cathode common terminal 406 substantially entirely while anode common terminal 405 and cathode common terminal 406 are partly exposed to the outside. The exposed portions of anode common terminal 405 and cathode common terminal 406 are bent along the side to bottom of package resin 408 to form anode terminal 405B and cathode terminal 406B on the bottom, thus providing surface-mount solid electrolytic capacitor 1002.

Figure 11:
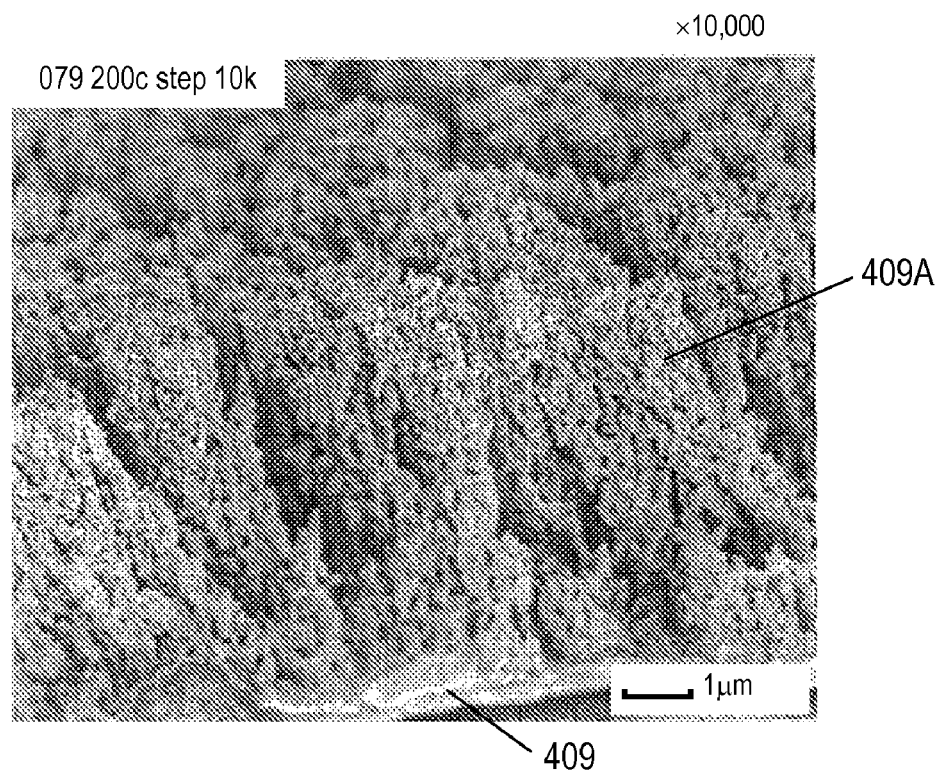
FIG. 11 is an enlarged view of an electrode foil of the electrolytic capacitor in accordance with Embodiment 2.
Figure 12:
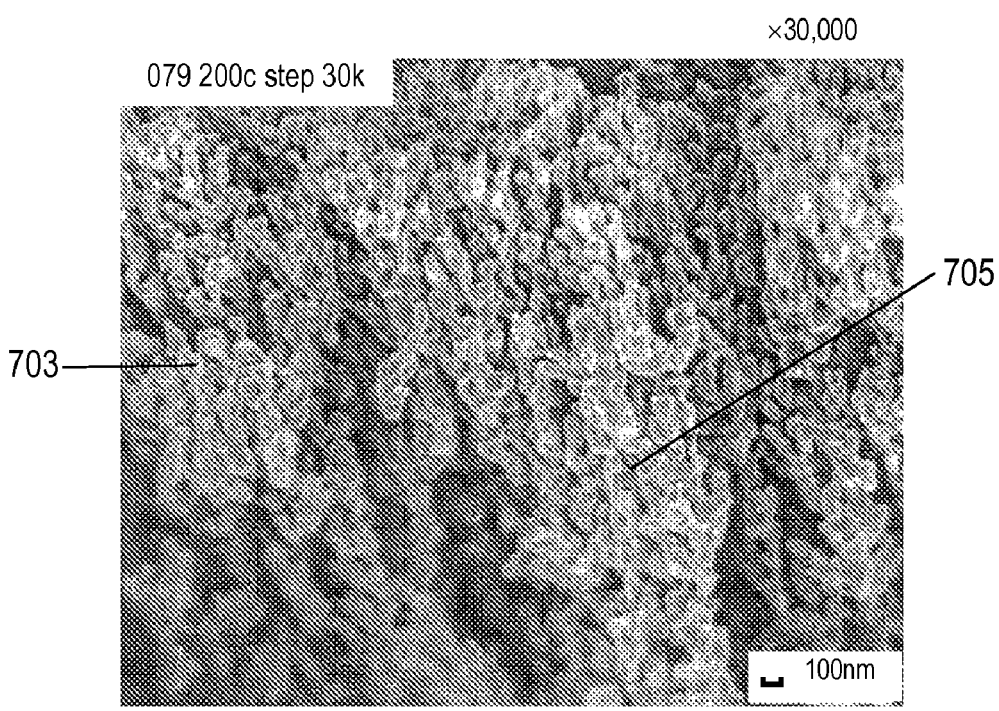
FIG. 12 is an enlarged view of the electrode foil shown in FIG. 11.

FIGS. 11 and 12 are enlarged views of electrode foil 451, microscopic photographs captured with scanning electron microscopes (SEM) and having magnifying powers of ten thousand and thirty thousand, respectively. As shown in FIGS. 11 and 12, rough surface layer 409A is formed of plural tree structures 705 clustered together and extending from base 409. Each tree structure 705 branches into plural twigs, and is formed of plural fine particles 703 coupled to each other and linking to have a shape of a caulerpa lentillifera.

Figure 13:
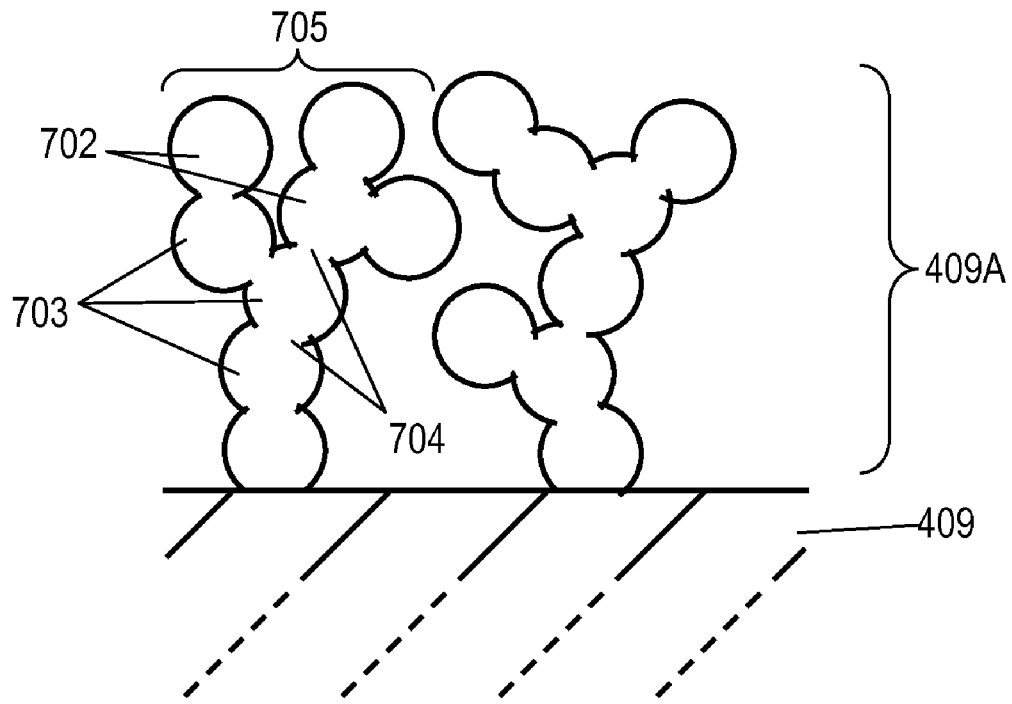
FIG. 13 is a schematic view of the electrode foil shown in FIG. 11.
Figure 14:
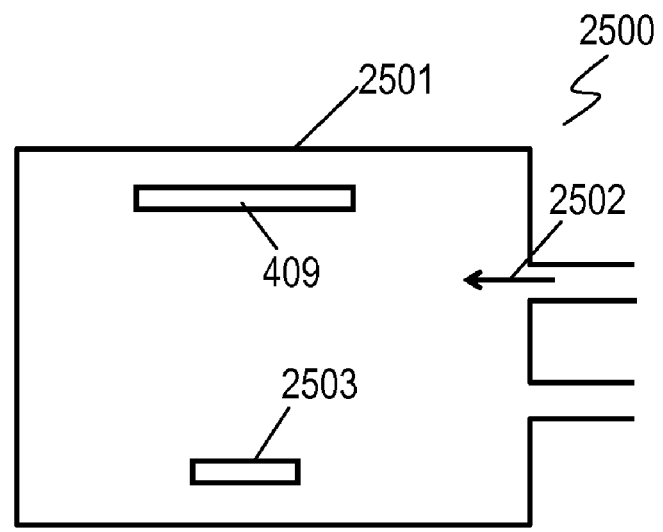
FIG. 14 is a schematic view of an apparatus for manufacturing the electrode foil shown in FIG. 11.

FIG. 13 is a schematic view of electrode foil 451. Rough surface layer 409A is formed on each of both surfaces of base 409. Rough surface layer 409A is formed of plural tree structures 705 clustered together and extending from base 409. Each tree structure 705 branches into plural twigs 702, and is formed of plural fine particles 703 coupled to each other and linking to have a shape of a caulerpa lentillifera.

A method for forming rough surface layer 409A having tree-structures 705 on base 409 by vacuum vapor deposition will be described below. FIG. 6 is a schematic view of apparatus 2500 for forming rough surface layer 409A. First, base 409 made of aluminum as valve action metal is placed in evaporation chamber 2501. The inside of chamber 2501 is maintained at vacuum at a pressure ranging from 0.01 Pa to 0.001 Pa. After that, ambient gas 2502 is put into chamber 2501. Ambient gas is made of 1 part by volume of oxygen gas and 2 to 6 parts by volume of argon gas. While atmosphere around base 409 is kept under a pressure ranging from 10 Pa to 30 Pa with the ambient gas at a temperature ranging from 150° C. to 300° C., evaporation source 2503 made of aluminum as valve action metal is placed in evaporation chamber 2501. Fine particles 703 of aluminum are deposited on the surface of base 409 to form tree structures 705, thereby providing rough surface layer 409A.

Base 409 according to Embodiment 2 is high-purity aluminum foil with a thickness of 50 μm. Ambient gas 2502 containing argon gas and oxygen gas is supplied into vacuum to cause file particles 703 made of aluminum to deposit on the surface of base 409, thereby providing electrode foil 451 shown in FIGS. 3 to 5. According to Embodiment 2, evaporation chamber 2501 before having ambient gas 2502 supplied therein is maintained as a vacuum at a pressure of 0.004 Pa. Ambient gas 2502 contains 1 part by volume of oxygen gas and 4 parts by volume of argon gas. The pressure of ambient gas 2502 is 10 Pa. The temperature of evaporation chamber 2501, that is, base 409 at vapor deposition of particles 703 is 150° C.

Figure 15:
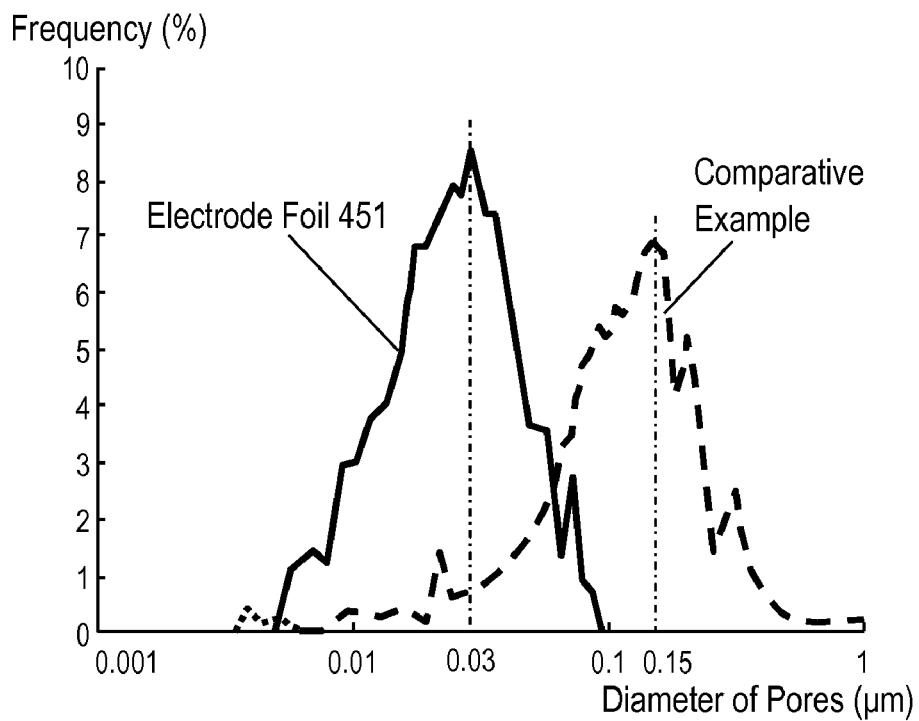
FIG. 15 shows distribution of diameters of pores in the electrode foil in accordance with Embodiment 2.

FIG. 15 shows a distribution of diameters of pores in electrode foil 451 and a distribution of diameters of pores in a comparative example of an electrode foil which is etched. The mode value of the diameters of the pores in electrode foil 451 is about 0.03 μm, which is extremely smaller than the mode of the comparative example of about 0.15 μm. The surface area of electrode foil 451 can be increased more than the comparative example. Rough surface layer 409A is formed of tree structures 705 extending from base 409, and can be impregnated with a larger amount of polymer solution than the comparative example.

Tree structure 705 is branched into twigs 702 formed of fine particles 703 linked to have a shape of a caulerpa lentillifera. This structure increases the bonding strength between fine particles 703, thus prevents necks 704 partially thin between particles 703 from breaking. Thus, necks 704 do not break when electrode foil 451 is anodized to form dielectric oxide film 453A. This structure thus not only increases the mechanical strength but also reduces the decreasing of the capacitance, accordingly allowing roll-type capacitor element 410 to be easily manufactured.

Characteristics of electrode foil 451 will be described in detail below.

Samples of electrode foil 451 in accordance with Embodiment 1 were prepared. These samples are different in a mode of diameters of pores and a thickness of rough surface layer 409A. Other samples of a comparative example of the electrode foil different in a thickness of the rough surface layer formed by etching were prepared. Each of the samples had an area of 10 cm$^2$. These samples were put into water solution containing 7% of ammonium adipate at a temperature of 70° C. for 20 minutes to anodize the samples under the condition of an anodizing voltage of 20V and a current density of 0.05 A/cm$^2$, thereby forming a dielectric oxide film on the rough surface layer of each sample. Then, the samples were put into water solution containing 8% of ammonium borate at a temperature of 30° C. together with a reference electrode, and then were measured in the capacitance between the anode foil of each sample and the reference electrode at a frequency of 120 Hz with an impedance analyzer. The capacitance was measured as an anodization capacitance which is a characteristic particular to the anode foil of each sample. The condition for the anodizing and the measuring condition are not limited to the above conditions.

Figure 16:
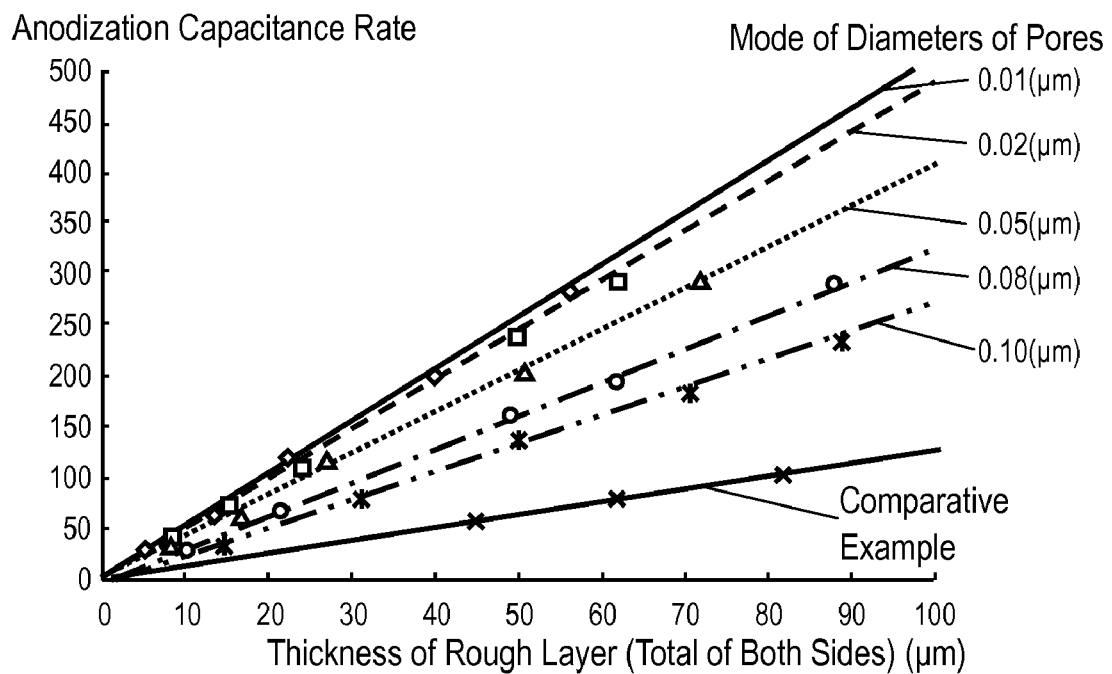
FIG. 16 shows characteristics of the electrode foil in accordance with Embodiment 2.

FIG. 16 shows relations between the thickness (of total of both sides) of the rough surface layer of the electrode foil having pores having various modes of diameters and an anodization capacitance rate. The anodization capacitance rate is defined as a rate of an anodization capacitance of the samples to that of the comparative example including the rough surface layer of the anode foil having a thickness (of total of both sides) of 80 μm, assuming that the anodization capacitance of the comparative example is 100.

As shown in FIG. 16, the anodization capacitance rate increases proportionately to the thickness of the rough surface layer, and increases as the mode of the diameters of the pores decreases. The anodization capacitance of the sample of anode foil 451 according to Embodiment 2 is larger than that of the comparative Example having the same thickness of the rough surface layer as that of the sample according to Embodiment 2. Electrode foil 451 according to Embodiment 2 thus can have a smaller thickness and a larger capacitance than the foil roughened by an etching method. This advantage becomes more effective as the diameters of the pores become smaller since the smaller diameters of pores produce the large surface area.

Next, each dielectric oxide film 453 of the samples of electrode foil 451 and the comparative example undergoes electropolymerization of pyrrole monomer to form solid electrolyte 454. After that, carbon and silver paste were applied on solid electrolyte 454 to form cathode layer 457 including carbon layer 455 and silver paste layer 456, thus providing capacitor element 410. Then, a capacitance between anode section 403 and cathode section 403 including cathode later 457 were measured as a product capacitance with an impedance analyzer at a frequency of 120 Hz. Then, a product capacitance rate is calculated. The product capacitance rate is defined as a rate of the product capacitance of capacitor element 410 to that of the comparative example including the electrode foil having a thickness (total of both sides) of 80 μm, assuming that the product capacitance of the comparative example is 100.

Figure 17:
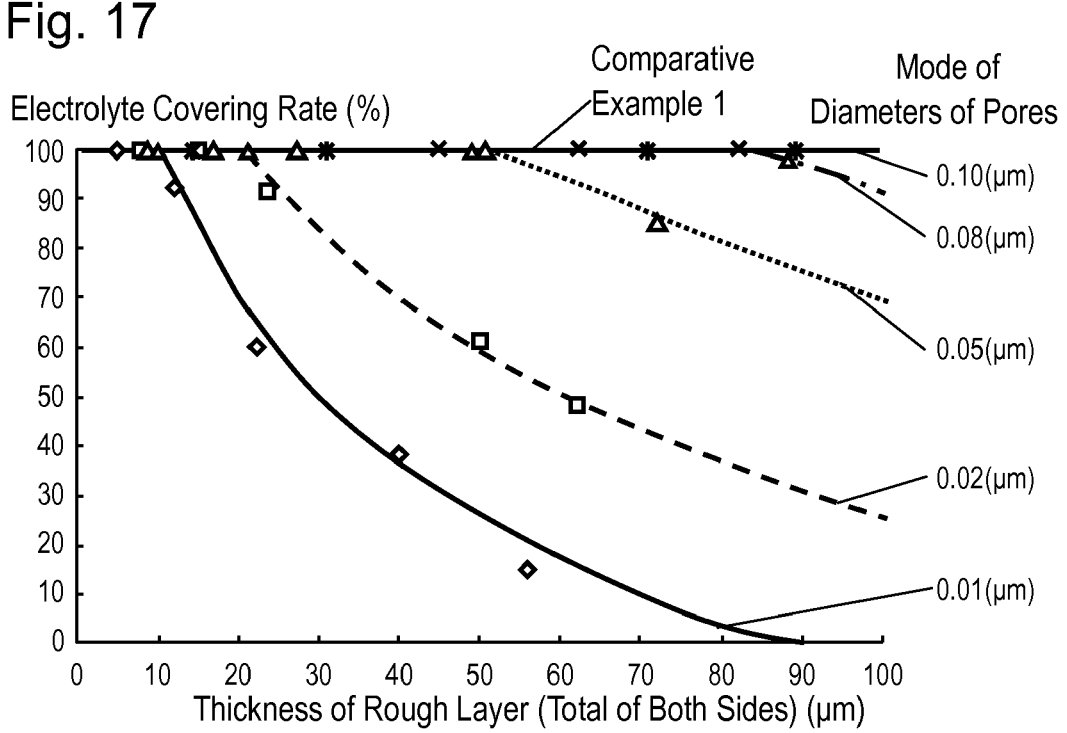
FIG. 17 shows characteristics of the electrode foil in accordance with Embodiment 2.

FIG. 17 shows relations between an electrolyte covering rate (%) and the thickness (total of both sides) of the rough surface layer of the electrode foil having various modes of the diameters of pores. The electrolyte covering rate (%) is calculated by dividing the product capacitance rate by the anodization capacitance rate, and multiplying the quotient by 100.

As shown in FIG. 17, the electrolyte covering rate decreases as the mode of the diameters of the pores decreases, and decreases as the thickness of the rough surface layer decreases. This is because a smaller mode of the diameters of the pores prevents the monomer of the solid electrolyte from impregnating into the pores, and yet, a large thickness of the rough surface layer further facilitates to prevent the monomer from impregnating into the rough surface layer.

Therefore, in order to obtain a predetermined electrolyte covering rate, the mode of the diameters of the pores is increased as the thickness of the rough surface layer increases. In other words, as the thickness of the rough surface layer decreases, the mode of the diameters of the pores is decreased to prevent the electrolyte covering rate from decreasing.

Figure 18:
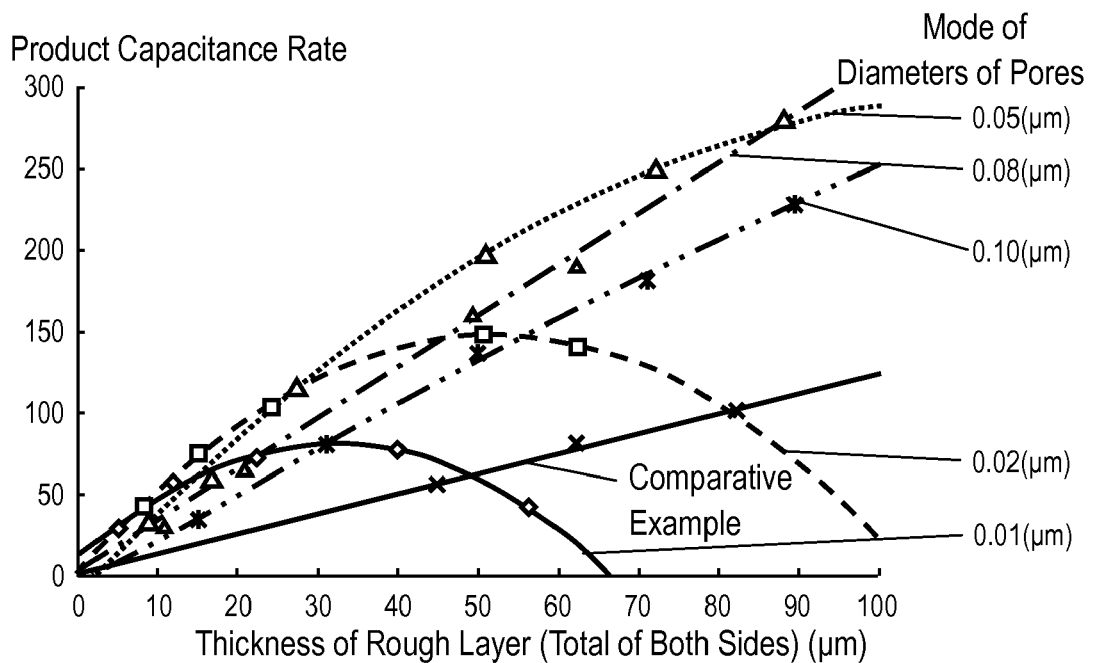
FIG. 18 shows characteristics of the electrolytic capacitor in accordance with Embodiment 2.

FIG. 18 shows the relation among the diameters of the pores, the thickness of the rough surface layer, and the product capacitance. This relation is determined by the relation among the diameters of the pores, the thickness of the rough surface layer and the anodization capacitance rate shown in FIG. 16 and by the relation among the diameters of the pores, the thickness of the rough surface layer and the electrolyte covering rate shown in FIG. 17. The sample having the largest anodization capacitance rate and the mode of 0.01 μm shown in FIG. 16 has a small electrolyte covering rate, as shown in FIG. 17. Those samples thus have the product capacitance rates do not exceed 100, as shown in FIG. 18. In other words, the electrode foil having the mode of 0.01 μm cannot produce a larger capacitance than the electrolytic capacitor including the comparative example of the electrode foil.

Samples, out of the samples having the mode of the diameters of the pores of 0.02 μm, having the thickness of the rough surface layer ranging from 20 μm to 80 μm have product capacitance rates larger than 100. However, some of the samples, out of the samples having the mode of the diameters of the pores of 0.02 μm, having small thicknesses of rough surface layers do not necessarily have product capacitance rates larger than 100.

Even if having a product capacitance rate not exceeding 100, the samples have a capacitance per thickness of the rough surface layer exceeds that of the anode foil roughened by the etching method. Therefore, the electrode foil having a thin rough surface layer can provide a capacitor having a capacitance as large as the capacitor including the electrode foil of the comparative example roughened by the etching method. A larger mode of diameters of the pores increases the electrolyte covering rate, providing a reliable electrolytic capacitance.

That is, in the case that the rough surface layer of the electrode foil of the comparative example roughened by the etching method has a thickness (total of both sides) of 80 μm, an anode base, i.e. parts of the electrode foil other than the rough surface layer needs a thickness not less than 25 μm in order to maintain the mechanical strength. The thickness of the electrode foil of the comparative example thus is 105 μm. In the electrode anode foil in accordance with Embodiment 2, the thickness of the rough surface layer (total of both sides) is 20 μm, so that the total thickness of the electrode foil is 45 μm (=20 μm+25 μm). The electrode foil provides a capacitance which is provided by the electrode foil of the comparative example having the thickness of 80 μm. Since the thicker base reduces an equivalent series resistance (ESR), the thicknesses of both of the rough surface layer and the base can be designed based on a desirable capacitance and ESR so that a greater margin for the design can be obtained.

As discussed above, the mode of the diameters of the pores of electrode foil 451 in accordance with Embodiment 2 ranges from 0.02 μm to 0.10 μm, and the thickness (total of both sides) of the rough surface layer ranges from 20 μm to 80 μm. The product capacitance rate of electrode foil 451 sufficiently exceeds 100. In other words, solid electrolytic capacitor 1002 including electrode foil 451 is thinner and has a larger capacitance than the comparative example including the electrode foil which is roughened by the etching method and which has a thickness of 80 μm.

Exemplary Embodiment 3

Figure 19:
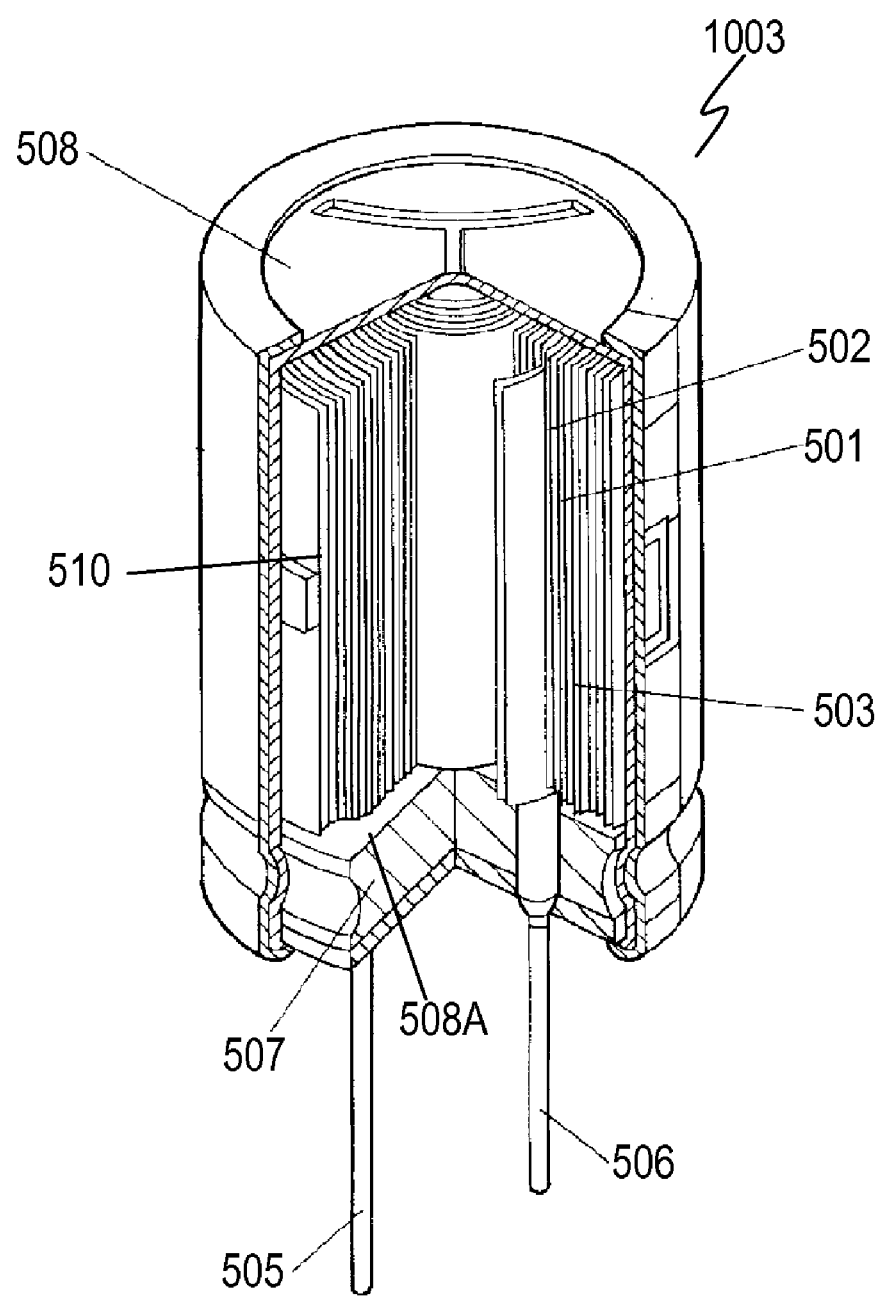
FIG. 19 is a partly sectional perspective view of an electrolytic capacitor in accordance with Exemplary Embodiment 3 of the invention.
Figure 20:
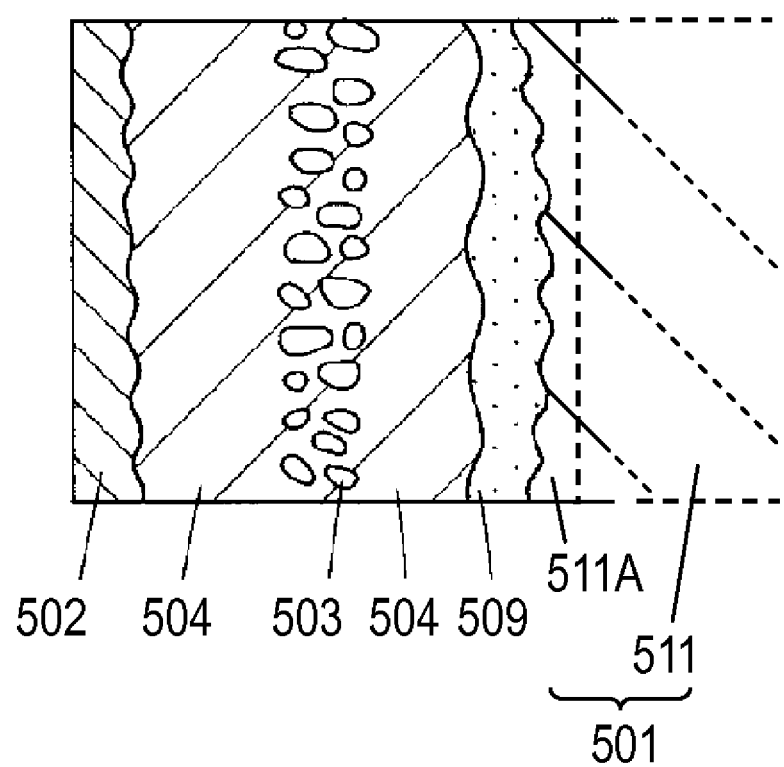
FIG. 20 is an enlarged sectional view of a capacitor element of the electrolytic capacitor in accordance with Embodiment 3.

FIG. 19 is a partly-sectional perspective view of electrolytic capacitor 1003 in accordance with Exemplary Embodiment 3 of the present invention. FIG. 20 is an enlarged sectional view of electrolytic capacitor 1003. Capacitor element 510 includes electrode foils 501 and 502 and separator 503 provided between electrode foils 501 and 502. Electrode foil 501 and electrode foil 503 function as electrodes, i.e., anode and cathode, respectively. Electrode foils 501 and 502 and separator 503 are rolled together to form a roll-type of capacitor element 510. Electrode foil 501 includes base 511 and rough surface layer 511A. Base 511 is made of foil of valve metal, such as aluminum. Rough surface layer 511A is formed by vapor-depositing valve metal, aluminum, on a surface of base 511. Rough surface layer 511A is rougher than base 511. Electrode foil 501 is anodized to form dielectric oxide film 509 on rough surface layer 511A. Electrode foil 502 is obtained by etching foil made of valve metal, such as aluminum. Lead wires 505 and 506 are connected to electrode foils 501 and 502, respectively. Separator 503 is disposed between dielectric oxide film 509 and electrode foil 502 to contact dielectric oxide film 509 and electrode foil 502. After capacitor element 510 is formed, separator 503 is heated to carbonize separator 503.

Solid electrolyte 504 made of conductive polymer is provided between electrode foils 501 and 502. Lead wires 505 and 506 are connected to electrode foils 501 and 502, respectively. Case 508 made of aluminum accommodates capacitor element 510 therein. Opening 508A of case 508 is sealed with sealing plug 507 made of resin vulcanized butyl rubber. Lead wires 505 and 506 are exposed to the outside of case 508 through sealing plug 507.

In order to form solid electrolyte 504, capacitor element 510 is immersed into solution prepared by mixing I part of ethylenedioxy thiophene as a heterocyclic monomer, 2 parts of p-triene ferric sulfonate as oxidant, and 4 parts of n-butanol as polymerization solvent. Upon being taken out of the solution, capacitor element 510 is left at a temperature of 85° C. for 60 minutes, thereby forming solid electrolyte 504. This process produces polyethylenedioxy thiophene, conductive polymer, by chemical polymerization, but solid electrolyte 504 is not necessarily made of this polymer.

Figure 21:
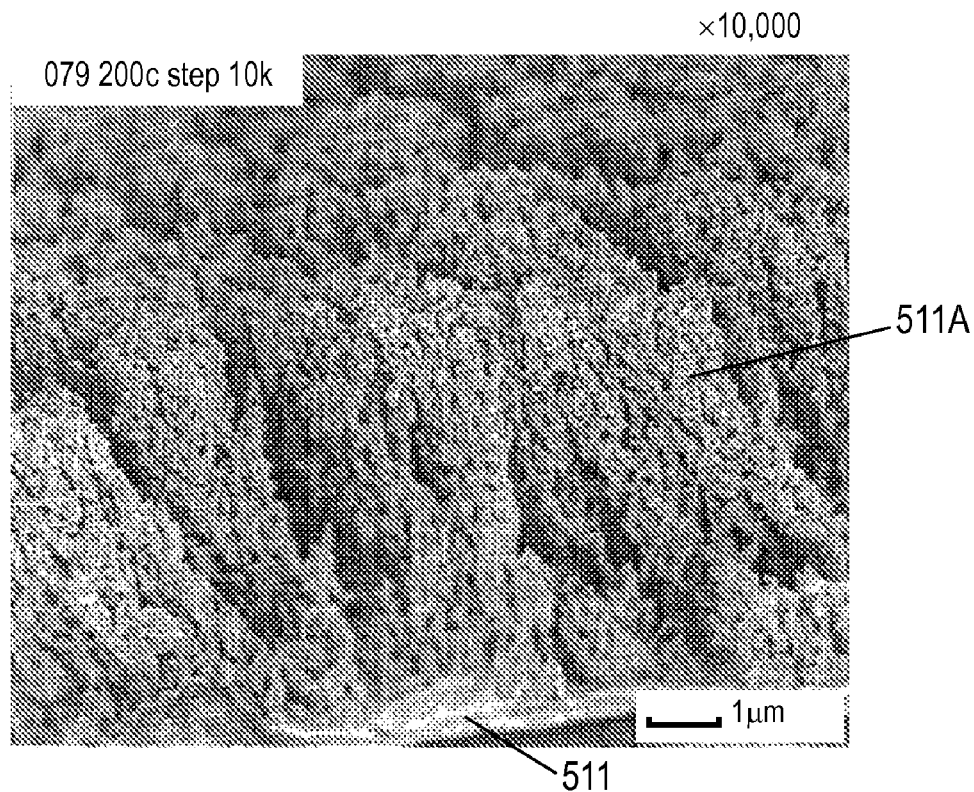
FIG. 21 is an enlarged view of an electrode foil of the electrolytic capacitor in accordance with Embodiment 3.
Figure 22:
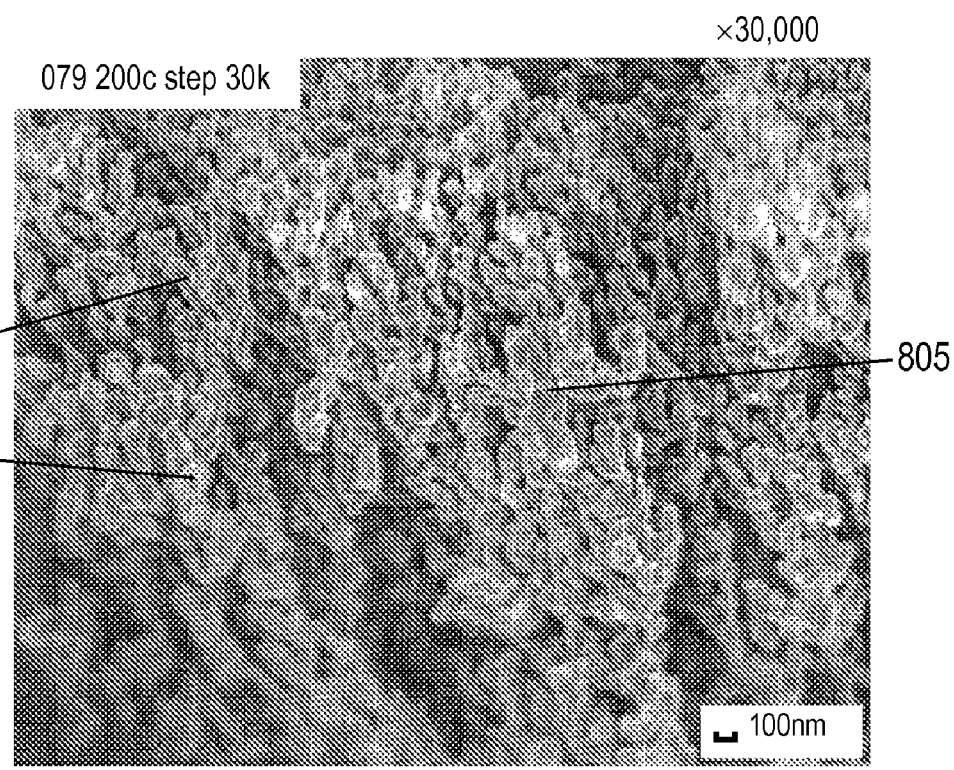
FIG. 22 is an enlarged view of the electrode foil shown in FIG. 21.

FIGS. 21 and 22 are enlarged views of electrode foil 501, microscopic photographs captured with scanning electron microscopes (SEM) and having magnifying powers of ten thousand and thirty thousand, respectively. As shown in FIGS. 21 and 22, rough surface layer 511A is formed of plural tree structures 805 clustered together and extending from base 511. Each tree structure 805 branches into plural twigs, and is formed of plural fine particles 803 coupled to each other and linking to have a shape of a caulerpa lentillifera.

Figure 23:
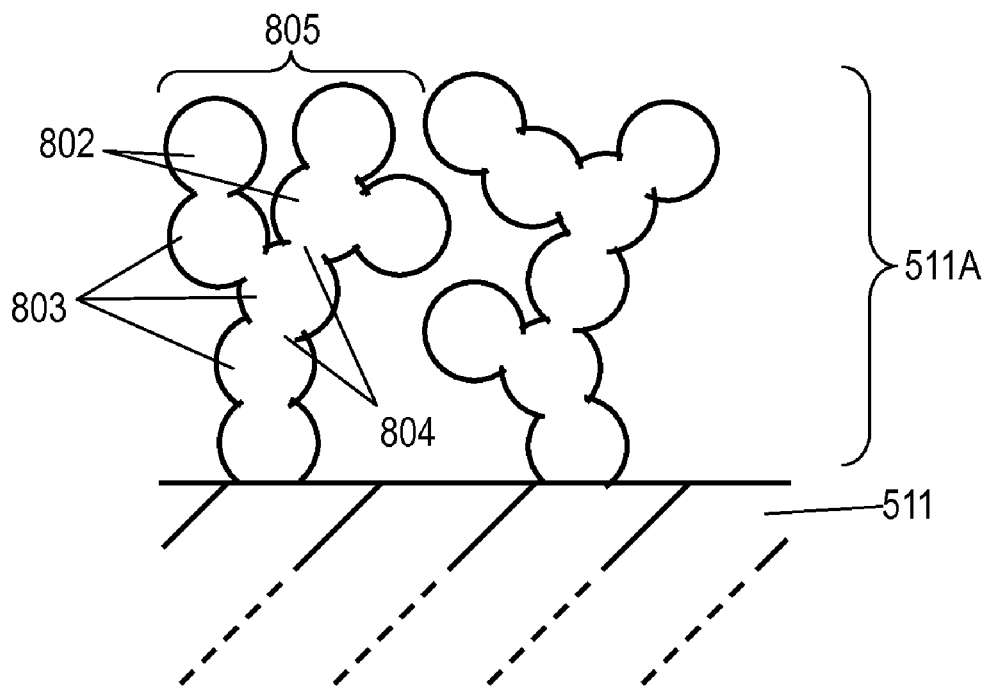
FIG. 23 is a schematic view of the electrode foil shown in FIG. 21.

FIG. 23 is a schematic view of electrode foil 501. Rough surface layer 511A is formed of plural tree structures 805 clustered together and extending from base 511A. Each tree structure 805 branches into plural twigs 802, and is formed of plural fine particles 803 coupled to each other and linking to have a shape of a caulerpa lentillifera.

Figure 24:
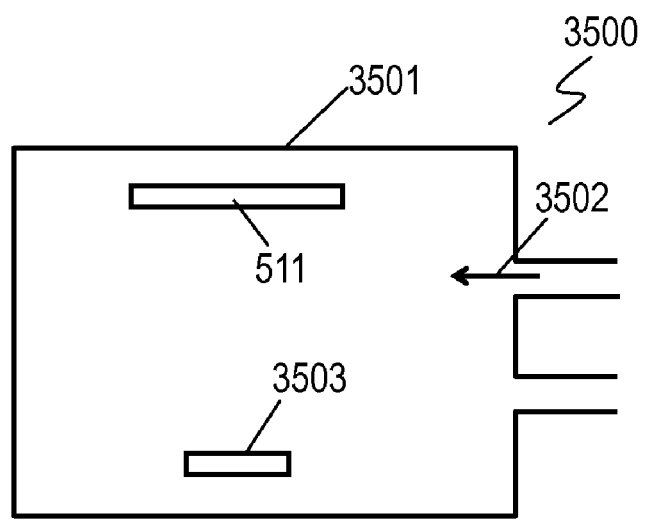
FIG. 24 is a schematic view of an apparatus for manufacturing the electrode foil shown in FIG. 21.

A method for forming rough surface layer 511A having tree-structures 805 on base 511 by vacuum vapor deposition will be described below. FIG. 24 is a schematic view of apparatus 3500 for forming rough surface layer 511A. First, base 511 made of aluminum as valve action metal is placed in evaporation chamber 3501. The inside of chamber 3501 is maintained at vacuum at a pressure ranging from 0.01 Pa to 0.001 Pa. After that, ambient gas 3502 is put into chamber 3501. Ambient gas is made of 1 part by volume of oxygen gas and 2 to 6 parts by volume of argon gas. While atmosphere around base 511 is kept under a pressure ranging from 10 Pa to 30 Pa with the ambient gas at a temperature ranging from 150° C. to 300° C., evaporation source 3503 made of aluminum as valve action metal is placed in evaporation chamber 3501. Fine particles 803 of aluminum are deposited on the surface of base 511 to form tree structures 805, thereby providing rough surface layer 511A.

Base 511 according to Embodiment 3 is high-purity aluminum foil with a thickness of 50 µm. Ambient gas 3502 containing argon gas and oxygen gas is supplied into vacuum to cause file particles 803 made of aluminum to deposit on the surface of base 511, thereby providing electrode foil 501 shown in FIGS. 21 to 32. According to Embodiment 3, evaporation chamber 3501 before having ambient gas 3502 supplied therein is maintained as a vacuum at a pressure of 0.004 Pa. Ambient gas 3502 contains 1 part by volume of oxygen gas and 4 parts by volume of argon gas. The pressure of ambient gas 3502 is 30 Pa. The temperature of evaporation chamber 3501, that is, base 511 at vapor deposition of particles 803 is 300° C.

Figure 25:
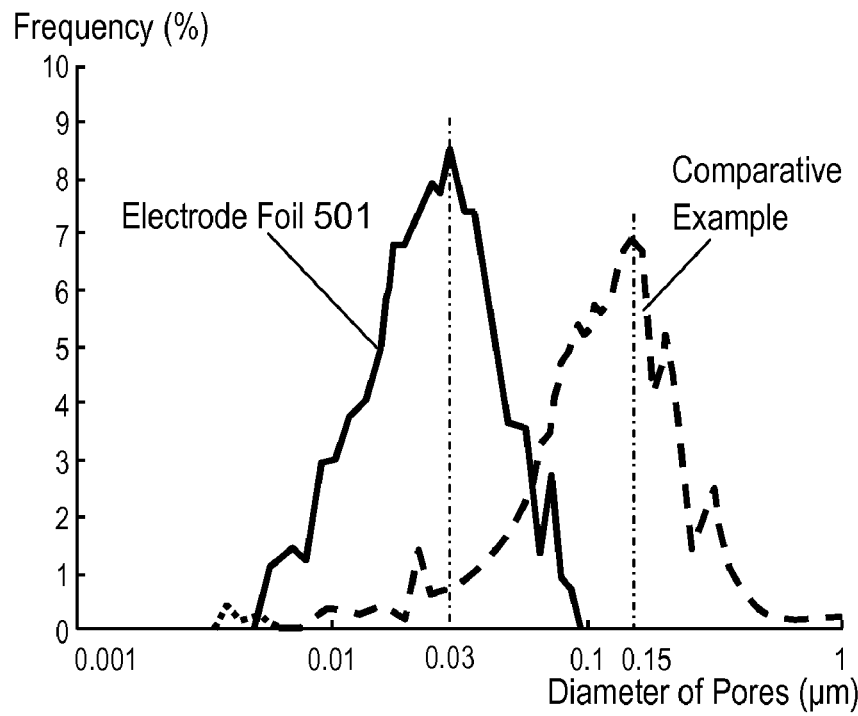
FIG. 25 shows distribution of diameters of pores in the electrode foil in accordance with Embodiment 3.

FIG. 25 shows a distribution of diameters of pores in electrode foil 501 and a distribution of diameters of pores in a comparative example of an electrode foil which is etched. The mode value of the diameters of the pores in electrode foil 501 is about 0.03 µm, which is extremely smaller than the mode of those of the comparative example of about 0.15 µm. The surface area of electrode foil 501 can be increased more than the comparative example. Rough surface layer 511A is formed of tree structures 705 extending from base 511, and can be impregnated with a larger amount of polymer solution than the comparative example.

Tree structure 805 is branched into twigs 802 formed of fine particles 803 linked to have a shape of a caulerpa lentillifera. This structure increases the bonding strength between fine particles 803, thus prevents necks 804 partially thin between particles 803 from breaking. Thus, necks 804 do not break when electrode foil 501 is anodized to form dielectric oxide film 509. This structure thus not only increases the mechanical strength but also reduces the decreasing of the capacitance, accordingly allowing roll-type capacitor element 510 to be easily manufactured.

Characteristics of electrode foil 501 will be described in detail below.

Samples of electrode foil 501 in accordance with Embodiment 3 were prepared. These samples are different in a mode of diameters of pores and a thickness of rough surface layer 511A. Other samples of a comparative example of the electrode foil different in a thickness of the rough surface layer formed by etching were prepared. Each of the samples had an area of 10 cm$^2$. These samples were put into water solution containing 7% of ammonium adipate at a temperature of 70° C. for 20 minutes to anodize the samples under the condition of an anodizing voltage of 20V and a current density of 0.05 A/cm$^2$, thereby forming a dielectric oxide film on the rough surface layer of each sample. Then, the samples were put into water solution containing 8% of ammonium borate at a temperature of 30° C. together with a reference electrode, and then were measured in the capacitance between the anode foil of each sample and the reference electrode at a frequency of 120 Hz with an impedance analyzer. The capacitance was measured as an anodization capacitance which is a characteristic particular to the anode foil of each sample. The condition for the anodizing and the measuring condition are not limited to the above conditions.

Figure 26:
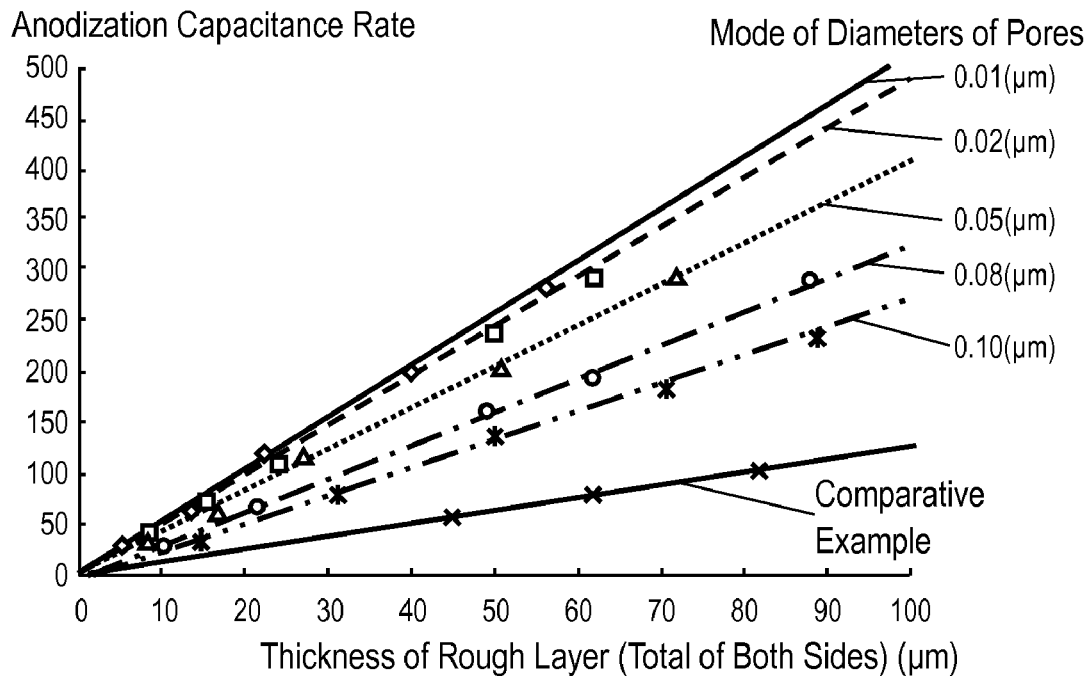
FIG. 26 shows characteristics of the electrode foil in accordance with Embodiment 3.

FIG. 26 shows relations between the thickness (of total of both sides) of the rough surface layer of the electrode foil having pores having various modes of diameters and an anodization capacitance rate. The anodization capacitance rate is defined as a rate of an anodization capacitance of the samples to that of the comparative example including the rough surface layer of the anode foil having a thickness (of total of both sides) of 80 μm, assuming that the anodization capacitance of the comparative example is 100.

As shown in FIG. 26, the anodization capacitance rate increases proportionately to the thickness of the rough surface layer, and increases as the mode of the diameters of the pores decreases. The anodization capacitance of the sample of anode foil 501 according to Embodiment 3 is larger than that of the comparative Example having the same thickness of rough surface layer 511A as that of the sample according to Embodiment 3. Electrode foil 501 according to Embodiment 3 thus can have a smaller thickness and a larger capacitance than the foil roughened by an etching method. This advantage becomes more effective as the diameters of the pores become smaller since the smaller diameters of pores produce the large surface area.

Next, each dielectric oxide film 509 of the samples of electrode foil 501 and the comparative example undergoes electropolymerization of pyrrole monomer to form solid electrolyte 504. After that, electrode foil 502 was provided on solid electrolyte 504, thus providing capacitor element 510. Then, a capacitance between electrode foils 502 and 503 was measured as a product capacitance with an impedance analyzer at a frequency of 120 Hz. Then, a product capacitance rate is calculated. The product capacitance rate is defined as a rate of the product capacitance of capacitor element 510 to that of the comparative example including the electrode foil having a thickness (total of both sides) of 80 μm, assuming that the product capacitance of the comparative example is 100.

Figure 27:
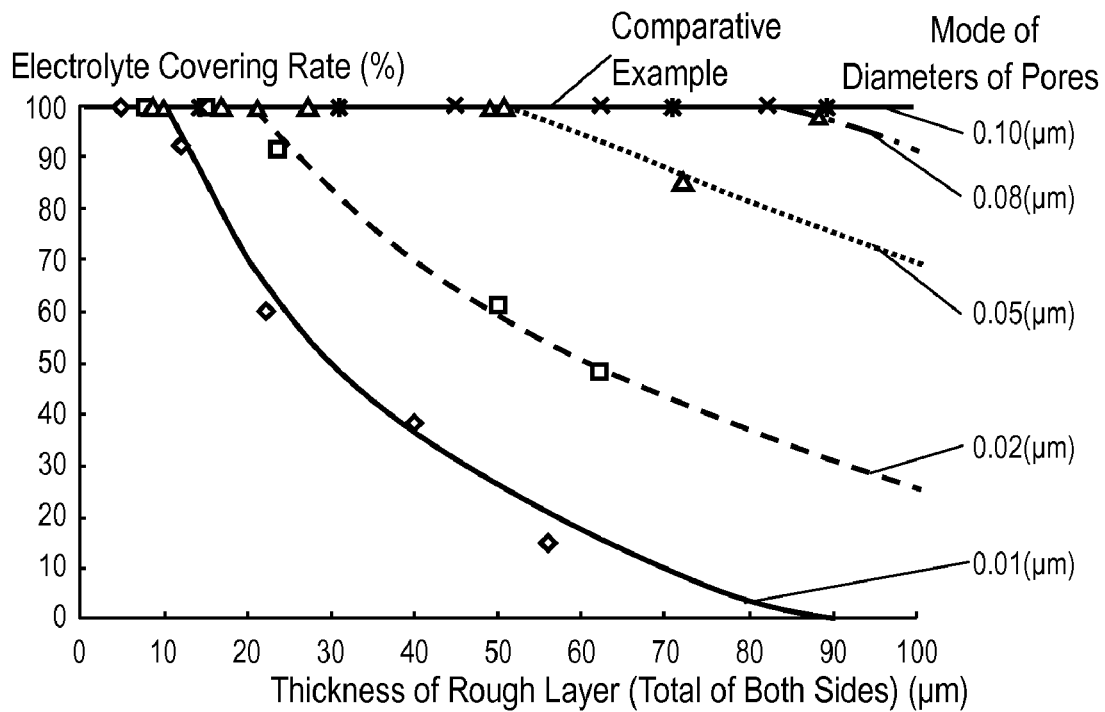
FIG. 27 shows characteristics of the electrode foil in accordance with Embodiment 3.

FIG. 27 shows relations between an electrolyte covering rate (%) and the thickness (total of both sides) of the rough surface layer of the electrode foil having various modes of the diameters of the pores. The electrolyte covering rate (%) is calculated by dividing the product capacitance rate by the anodization capacitance rate, and multiplying the quotient by 100.

As shown in FIG. 27, the electrolyte covering rate decreases as the mode of the diameters of the pores decreases, and decreases as the thickness of the rough surface layer decreases. This is because a smaller mode of the diameters of the pores prevents the monomer of the solid electrolyte from impregnating into the pores, and yet, a large thickness of the rough surface layer further facilitates to prevent the monomer from impregnating into the rough surface layer.

Therefore, in order to obtain a predetermined electrolyte covering rate, the mode of the diameters of the pores is increased as the thickness of the rough surface layer increases. In other words, as the thickness of the rough surface layer decreases, the mode of the diameters of the pores is decreased to prevent the electrolyte covering rate from decreasing.

Figure 28:
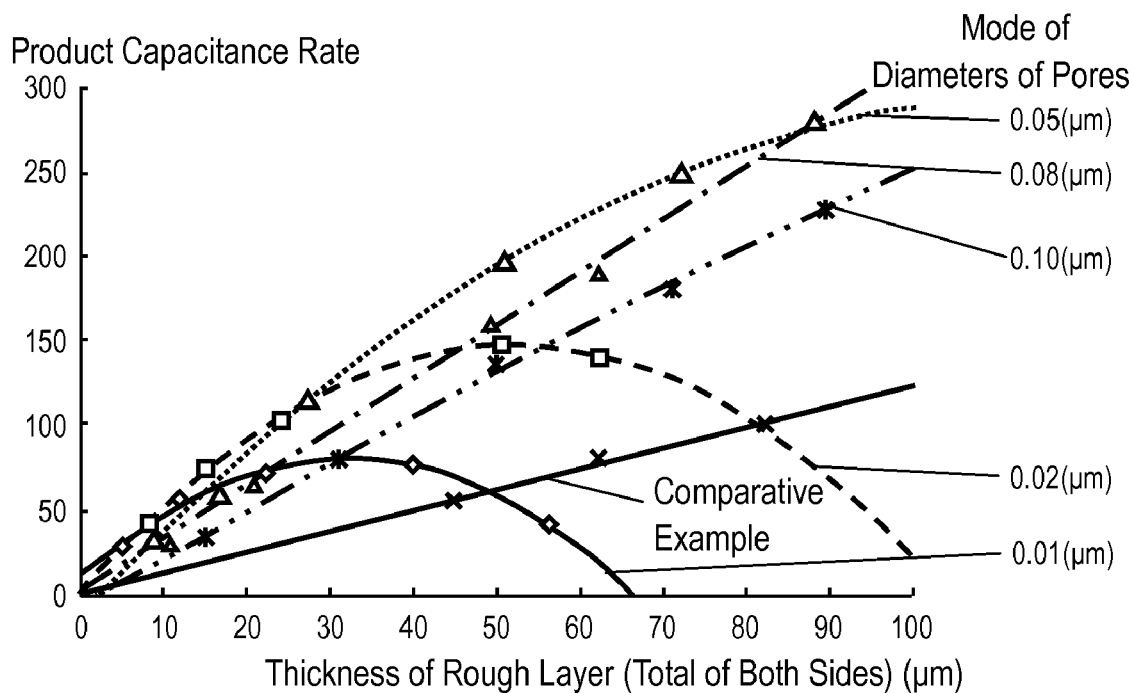
FIG. 28 shows characteristics of the electrode foil in accordance with Embodiment 3.

FIG. 28 shows the relation among the diameters of the pores, the thickness of the rough surface layer, and the product capacitance. This relation is determined by the relation among the diameters of the pores, the thickness of the rough surface layer and the anodization capacitance rate shown in FIG. 26 and by the relation among the diameters of the pores, the thickness of the rough surface layer and the electrolyte covering rate shown in FIG. 27. The sample having the largest anodization capacitance rate and the mode of 0.01 μm shown in FIG. 26 has a small electrolyte covering rate, as shown in FIG. 27. Those samples thus have the product capacitance rates do not exceed 100, as shown in FIG. 28. In other words, the electrode foil having the mode of 0.01 μm cannot produce a larger capacitance than the electrolytic capacitor including the comparative example of the electrode foil.

Samples, out of the samples having the mode of the diameters of the pores of 0.02 μm, having the thickness of the rough surface layer ranging from 20 μm to 80 μm have product capacitance rates larger than 100. However, some of the samples, out of the samples having the mode of the diameters of the pores of 0.02 μm, having small thicknesses of rough surface layers do not necessarily have product capacitance rates larger than 100.

Even if having a product capacitance rate not exceeding 100, the samples have a capacitance per thickness of the rough surface layer exceeds that of the electrode foil roughened by the etching method. Therefore, the electrode foil having a thin rough surface layer can provide a capacitor having a capacitance as large as the capacitor including the electrode foil of the comparative example roughened by the etching method. A larger mode of diameters of the pores increases the electrolyte covering rate, providing a reliable electrolytic capacitance.

That is, in the case that the rough surface layer of the electrode foil of the comparative example roughened by the etching method has a thickness (total of both sides) of 80 μm, an anode base, i.e. parts of the electrode foil other than the rough surface layer needs a thickness not less than 25 μm in order to maintain the mechanical strength. The thickness of the electrode foil of the comparative example thus is 105 μm. In the electrode anode foil in accordance with Embodiment 3, the thickness of the rough surface layer (total of both sides) is 20 μm, so that the total thickness of the electrode foil is 45 μm (=20 μm+25 μm). The electrode foil provides a capacitance which is provided by the electrode foil of the comparative example having the thickness of 80 μm. Since the thicker base reduces an equivalent series resistance (ESR), the thicknesses of both of rough surface layer 511A and base 511 can be designed based on a desirable capacitance and ESR so that a greater margin for the design can be obtained.

As discussed above, the mode of the diameters of the pores of electrode foil 501 in accordance with Embodiment 3 ranges from 0.02 μm to 0.10 μm, and the thickness (total of both sides) of rough surface layer 511A ranges from 20 μm to 80 μm. The product capacitance rate of electrode foil 501 sufficiently exceeds 100. In other words, solid electrolytic capacitor 1002 including electrode foil 501 is thinner and has a larger capacitance than the comparative example including the electrode foil which is roughened by the etching method and which has a thickness of 80 μm.

Separator 503 according to Embodiment 3 is formed by carbonizing electrolytic paper made of Manila fiber or kraft paper. Separator 503 may be made of polyethylene terephthalate resin. Polyethylene terephthalate resin contacts polyethylenedioxy thiophene of solid electrolyte 504 securely, accordingly providing capacitor 1003 with low impedance in high frequencies.

According to Embodiment 3, electrode foils 501 and 502 and separator 503 are rolled together to form capacitor element 510, and then, capacitor element is heated to carbonize separator 503, but it is not limited thereto. Before forming capacitor element 510, separator 503 alone may be carbonized by heating and then rolled with the electrode foils 501 and 502.

In electrolytic capacitor 1003 according to Embodiment 3, not only electrode foil 501 as anode, but also electrode foil 3 as cathode may be made of the aluminum foil having base 511 and rough surface layer 511A shown in FIGS. 21 to 23. In this case, the aluminum foil used as the cathode is not anodized or is anodized with a low voltage, such as about 2V, thereby providing the electrolytic capacitor with a small size and a large capacitance.

INDUSTRIAL APPLICABILITY

An electrode foil according to the present application provides an electrolytic capacitor with a small size and a large capacitance, which is useful for various electronic circuits.

The invention claimed is:

1. An electrode foil used for a capacitor, comprising:
a base made of foil of valve metal; and
a rough surface layer made of valve metal provided on a surface of the base, wherein
the rough surface layer includes a plurality of tree structures extending from the base, and
each of the tree structure includes a plurality of particles made of valve metal linked together and is branched into a plurality of twigs.

2. The electrode foil according to claim 1, wherein the foil of the base is made of aluminum, and the particles of the rough surface layer are made of aluminum.

3. The electrode foil according to claim 1, wherein a mode of diameters of pores in the rough surface layer ranges from 0.02 μm to 0.10 μm, and a thickness of the rough surface layer ranges from 20 μm to 80 μm.

4. A method of manufacturing electrode foil used for a capacitor, said method comprising:
placing a base in an evaporation chamber maintained at vacuum;
forming a rough surface layer having on the base by supplying an ambient gas containing oxygen gas and argon gas into the evaporation chamber having the base placed therein, and by disposing a valve action metal in the evaporation chamber with a pressure ranging from 10 Pa to 30 Pa, wherein
the rough surface layer includes a plurality of tree structures on the base, and
each of the tree structures includes a plurality of particles made of valve metal linked together and extending from the base and is branched into a plurality of twigs.

5. The method according to claim 4, wherein a mode of diameters of pores in the rough surface layer ranges from 0.02 μm to 0.10 μm, and a thickness of the surface rough layer ranges from 20 μm to 80 μm.

6. The method according to claim 4, wherein the particles are made of aluminum.

7. The method according to claim 4, wherein, in said forming the rough surface layer having on the base, the ambient gas contains 1 part by volume of oxygen gas and 2 to 6 parts by volume of argon gas.

8. The method according to claim 7, wherein, in said forming the rough surface layer having on the base, the ambient gas is made of 1 part by volume of oxygen gas and 2 to 6 parts by volume of argon gas.

9. An electrolytic capacitor comprising:
a first electrode foil;
a dielectric oxide film provided on the first electrode foil;
a second electrode foil;
a separator provided between the dielectric layer and the second electrode foil; and
an electrolytic solution that penetrates into the separator and contacts the dielectric oxide film and the second electrode foil, wherein
the first electrode foil includes
a base made of foil of valve metal; and
a rough surface layer made of valve metal provided on a surface of the base,
the rough, surface layer includes a plurality of tree structures on the base,
each of the tree structures includes a plurality of particles made of valve metal linked together and extending from the base and is branched into a plurality of twigs, and
the dielectric oxide film is provided on the rough surface layer.

10. The electrolytic capacitor according to claim 9, wherein the first electrode foil, the separator, and the second electrode foil are rolled together.

11. The electrolytic capacitor according to claim 9, wherein the foil of the base is made of aluminum, and the particles of the rough surface layer are made of aluminum.

12. The electrolytic capacitor according to claim 9, wherein a surface of the second electrode foil contacts the separator is a rough surface.

13. An electrolytic capacitor comprising:
a first electrode foil;
a dielectric oxide film disposed on each of both surfaces of the first electrode foil;
a solid electrolyte of made conductive polymer provided on the dielectric oxide film; and
an electrode provided on the solid electrolyte, wherein
the first electrode foil includes
a first base made of foil of valve metal; and
a first rough surface layer made of valve metal provided on each of both surface of the first base,
the first rough surface layer includes a plurality of tree structures on the base,
each of the tree structures includes a plurality of particles made of valve metal linked together and extending from the base and is branched into a plurality of twigs, and
the dielectric oxide film is provided on the first rough surface layer.

14. The electrolytic capacitor according to claim 13, wherein the foil of the first base is made of aluminum, and the particles of the first rough surface layer are made of aluminum.

15. The electrolytic capacitor according to claim 13, wherein the electrode includes
a carbon layer provided on the solid electrolyte, and
a silver paste layer provided on the carbon layer.

16. The electrolytic capacitor according to claim 13, further comprising
a separator provided between the dielectric oxide film and the electrode, wherein
the electrode includes a second electrode foil having a rough contacting the solid electrolyte.

17. The electrolytic capacitor according to claim 16, wherein the electrode includes
a second base made of the foil of valve metal, and
a second rough surface layer made of valve metal provided on each of both surfaces of the second base.

18. The electrolytic capacitor according to claim 17, wherein
a mode of diameters of pores in the second rough surface layer ranges from 0.02 μm to 0.10 μm, and a thickness of the rough surface layer ranges from 20 μm to 80 μm, and the solid electrolyte is provided on the second rough surface layer.

19. The electrolytic capacitor according to claim 18, wherein the second rough surface layer includes a plurality of tree structures extending from the first base, each of the tree structures including a plurality of particles made of valve metal linked together and being branched into a plurality of twigs.

20. The electrolytic capacitor according to claim 19, wherein the foil of second base is made of aluminum, and the particles of the second rough surface layer are made of aluminum.

21. A method of manufacturing an electrolytic capacitor, said method comprising:
    placing a base in an evaporation chamber maintained at vacuum;
    forming a first electrode foil including the base and a rough surface layer having on a surface of the base by supplying an ambient gas containing oxygen gas and argon gas into the evaporation chamber having the base placed therein, and by having valve metal deposit on the base in the evaporation chamber with a pressure ranging from 10 Pa to 30 Pa, wherein the rough surface layer includes a plurality of tree structures on the base, and each of the tree structures includes a plurality of particles made of valve metal linked together and extending from the base and is branched into a plurality of twigs;
    forming a dielectric oxide film on the rough surface layer of the first electrode foil;
    providing a separator between the first electrode foil and a second electrode foil; and
    impregnating the separator with electrolytic solution contacting the dielectric oxide film and the second electrode.

22. The method according to claim 21, wherein, in said forming the first electrode foil, the ambient gas contains 1 part by volume of oxygen gas and 2 to 6 parts by volume of argon gas.

23. The method according to claim 22, wherein, in said forming the first electrode foil, the ambient gas is made of 1 part by volume of oxygen gas and 2 to 6 parts by volume of argon gas.

24. A method of manufacturing an electrolytic capacitor, said method comprising:
    placing a base in an evaporation chamber maintained at vacuum;
    forming a first electrode foil including the base and a rough surface layer having on each of both surfaces of the base by supplying an ambient gas containing oxygen gas and argon gas into the evaporation chamber having the base placed therein, and by having valve metal deposit on the base in the evaporation chamber with a pressure ranging from 10 Pa to 30 Pa, wherein the rough surface layer includes a plurality of tree structures on the base, and each of the tree structures includes a plurality of particles made of valve metal linked together and extending from the base and is branched into a plurality of twigs;
    forming a dielectric oxide film on each of the both surfaces of the first electrode foil;
    providing a solid electrolyte made of conductive polymer on the dielectric oxide layer; and
    providing an electrode on the solid electrolyte.

25. The method according to claim 24, wherein, in said forming the first electrode foil, the ambient gas contains 1 part by volume of oxygen gas and 2 to 6 parts by volume of argon gas.

26. The method according to claim 25, wherein, in said forming the first electrode foil, the ambient gas is made of 1 part by volume of oxygen gas and 2 to 6 parts by volume of argon gas.

* * * * *